United States Patent
Munakata et al.

(10) Patent No.: US 9,129,006 B2
(45) Date of Patent: Sep. 8, 2015

(54) CREATION DEVICE, CREATION METHOD, AND RECORDING MEDIUM

(71) Applicant: FUJITSU LIMITED, Kawasaki-shi, Kanagawa (JP)

(72) Inventors: Satoshi Munakata, Kawasaki (JP); Kuniharu Takayama, Tama (JP); Naoto Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 13/970,886

(22) Filed: Aug. 20, 2013

(65) Prior Publication Data

US 2014/0059061 A1 Feb. 27, 2014

(51) Int. Cl.
*G06F 17/30* (2006.01)
*G06F 9/44* (2006.01)

(52) U.S. Cl.
CPC .............. *G06F 17/3061* (2013.01); *G06F 8/35* (2013.01)

(58) Field of Classification Search
CPC ...................................................... G06F 17/30
USPC ................................................ 707/600–899
See application file for complete search history.

(56) References Cited

U.S. PATENT DOCUMENTS

| 2003/0187834 | A1* | 10/2003 | Oda et al. ............................ 707/3 |
| 2005/0204344 | A1 | 9/2005 | Shinomi |
| 2011/0029513 | A1* | 2/2011 | Morris ........................... 707/728 |

FOREIGN PATENT DOCUMENTS

| JP | 7-311683 | 11/1995 |
| JP | 2004-252512 | 9/2004 |
| JP | 2005-258944 | 9/2005 |
| JP | 2008-123432 | 5/2008 |

OTHER PUBLICATIONS

Ubayashi, Naoyasu, et al., "An Extensible MDA Model Compiler Based on Aspect-oriented Mechanisms," 2004 English Version: Ubayashi, Naoyasu, et al., "Model compiler construction based on aspect-oriented mechanisms," Kyushu Institute of Technology Academic Repository, 2005, pp. I-XVI.
Schaefer, Ina, et al., "Pure Delta-oriented Programming," *FOSD '10*, ACM, 2010, pp. 1-8.

* cited by examiner

*Primary Examiner* — Isaac M Woo
(74) *Attorney, Agent, or Firm* — Staas & Halsey LLP

(57) ABSTRACT

A device determines an additional component added to a second model, and a modification component modified in a third model, wherein a condition includes a wild card, and a first model are described in a module, the first model serving as a model when the module is applied to a model satisfying the condition and including a variable in which a string in a model satisfying the condition is stored, and the third model is a model when the module is applied to the second model satisfying the condition and where a string in the second model, which corresponds to the wild card, is stored in a variable, based on a word in a fourth model, and a word in the additional component and the modification component, calculates a degree regarding numbers of the word in the third model and the fourth, and creates a tag corresponding to the module.

9 Claims, 35 Drawing Sheets

FIG. 8

| ITEM | VALUE |
|---|---|
| SEARCH KEYWORD | "LENDING", "CONFIRMATION" |
| SELECTION COMPONENT ID | 「ID="1"」 |
| APPLICATION TARGET MODEL | <BusinessModel name="Book Lending/Receiving Service"><br>...<br>  <Activity ID="1"name="Lending Information Is Input"/><br>  <Flow ID="2" from="1" to="3"/><br>  <EndEvent ID="3"/><br>...<br></BusinessModel> |

FIG. 11

| DIFFERENCE ID | APPLICATION EXAMPLE ID | BUSINESS FLOW MODEL BEFORE DIFFERENCE MODULE IS APPLIED | APPLICATION EXAMPLE |
|---|---|---|---|
| 20111220 | 20111220#1 | \<BusinessModel name="Book Lending/Receiving Service"\> \<Activity ID="1"name="Lending Information Is Input... \<SequenceFlow D="2" from="1" to="3"/\> \<EndEvent ID="3"/\> ... | \<BusinessModel name="Book Lending/Receiving Service"\> \<Activity ID="1"name="Lending Information Is Input"/\> \<SequenceFlow D="2" from="1" to="4"/\> \<EndEvent ID="3"/\> \<Gateway ID="4" name="Lending Information Is Unauthorized?"/\> \<ConditionalFlow ID="5" name="yes" from="4" ... \<ConditionalFlow ID="6" name="no" from="4" ... ... |

FIG. 13

| DIFFERENCE ID | NAME | XML REPRESENTATION |
|---|---|---|
| 19850527 | TRANSFER OF AUTHORITY | <DeltaModule nam...><br>...<br>...<br></DeltaModule> |
| 20090101 | CONFIRMATION OF INPUT VALUE | <DeltaModule nam...><br>...<br>...<br></DeltaModule> |
| 20111220 | INPUT INFORMATION VERIFICATION | <DeltaModule nam...><br>...<br>...<br></DeltaModule> |

FIG. 14

| DIFFERENCE ID | TAG ID | ADDITION/ MODIFICATION | COMPONENT | DETAIL | WORD |
|---|---|---|---|---|---|
| 20111220 | 20111220-1 | ADDITION | BRANCH (ID:4) | "$1 Information Is Unauthorized?" | INFORMATION, UNAUTHORIZED |
| | 20111220-2 | ADDITION | CONDITIONAL FLOW (ID:5) | "$1 Information Is Unauthorized?""$1→ Information Is Input" | INFORMATION, UNAUTHORIZED, INPUT |
| | 20111220-3 | ADDITION | CONDITIONAL FLOW (ID:6) | "$1 Information Is Unauthorized?"→ "End" | INFORMATION, UNAUTHORIZED |
| | 20111220-4 | MODIFICATION | FLOW (ID:2) | "$1 Information Is Input"→ "$1 Information Is Unauthorized?" | INFORMATION, UNAUTHORIZED, INPUT |

FIG. 15

| DIFFERENCE ID (5c_1) | APPLICATION EXAMPLE ID (5c_2) | BUSINESS FLOW MODEL BEFORE DIFFERENCE MODULE IS APPLIED (5c_3) | APPLICATION EXAMPLE (5c_4) |
|---|---|---|---|
| 20111220 | 20111220#1 | <BusinessModel name="Book Lending/Receiving Service"><br><Activity ID="1"name="Lending Information Is Input...<br><SequenceFlow ID="2" from="1" to="3"/><br><EndEvent ID="3"/><br>... | <BusinessModel name="Book Lending/Receiving Service""><br><Activity ID="1"name="Lending Information Is Input"/><br><SequenceFlow ID="2" from="1" to="4"/><br><EndEvent ID="3"/><br><Gateway ID="4" name="Lending Information Is Unauthorized?"/><br><ConditionalFlow ID="5" name="yes" from="4"...<br><ConditionalFlow ID="6" name="no" from="4"...<br>... |
| 20090101 | 20090101#1 | <BusinessModel name="Sample Analysis Service"><br><Activity ID="1"name="Analysis Sample Is Input...<br><SequenceFlow ID="2" from="1" to="3"/><br><EndEvent ID="3"/><br>... | <BusinessModel name="Sample Analysis Service"><br><Activity ID="1" name="Analysis Sample Is Input"/><br><SequenceFlow ID="2" from="1" to="4"/><br><Activity ID="4" name="Analysis Sample Is Put on Centrifugal Separator...<br><EndEvent ID="3"/><br>... |

| DIFFERENCE ID | ADDITIONAL COMPONENT | |
|---|---|---|
| 20111220 | BRANCH(ID:4) | "$1 Information Is Unauthorized?" |
| | CONDITIONAL FLOW(ID:5) | "$1 Information Is Unauthorized?""$1 Information Is Input" |
| | CONDITIONAL FLOW(ID:6) | "$1 Information Is Unauthorized?""End" |
| DIFFERENCE ID | MODIFICATION COMPONENT | |
| 20111220 | FLOW(ID:2) | "$1 Information Is Input""$1 Information Is Unauthorized?" |

FIG. 17

| DIFFERENCE ID | TAG ID | ADDITION/ MODIFICATION | COMPONENT | DETAIL | WORD |
|---|---|---|---|---|---|
| 20111220 | 20111220-1 | ADDITION | BRANCH (ID:4) | "$1 Information Is Unauthorized?" | INFORMATION, UNAUTHORIZED |
| | 20111220-2 | ADDITION | CONDITIONAL FLOW (ID:5) | "$1 Information Is Unauthorized?"→ "$1 Information Is Input" | INFORMATION, UNAUTHORIZED, INPUT |
| | 20111220-3 | ADDITION | CONDITIONAL FLOW (ID:6) | "$1 Information Is Unauthorized?"→"End" | INFORMATION, UNAUTHORIZED |
| | 20111220-4 | MODIFICATION | FLOW (ID:2) | "$1 Information Is Input"→ "$1 Information Is Unauthorized?" | INFORMATION, UNAUTHORIZED, INPUT |
| 20090101 | 20090101-1 | ADDITION | ACTIVITY (ID:4) | "$1 Is Put on Centrifugal Separator" | CENTRIFUGAL SEPARATOR |
| | 20090101-2 | ADDITION | FLOW (ID:5) | "$1 Is Put on Centrifugal Separator"→ "$1 Is Confirmed" | CENTRIFUGAL SEPARATOR, CONFIRMATION |
| | 20090101-3 | MODIFICATION | FLOW (ID:2) | "$1 Is Input"→"$1 Is Put on Centrifugal Separator" | INPUT, CENTRIFUGAL SEPARATOR |

FIG. 18

| APPLICATION EXAMPLE ID | ADDITIONAL COMPONENT | |
|---|---|---|
| 20111220#1 | BRANCH(ID:4) | "Lending Information Is Unauthorized?" |
| | CONDITIONAL FLOW(ID:5) | "Lending Information Is Unauthorized?"→ "Lending Information Is Input" |
| | CONDITIONAL FLOW(ID:6) | "Lending Information Is Unauthorized?"→ "End" |
| 20090101#1 | ACTIVITY(ID:4) | "Analysis Sample Is Put on Centrifugal Separator" |
| | FLOW(ID:5) | "Analysis Sample Is Put on Centrifugal Separator"→ "Analysis Sample Is Confirmed" |
| APPLICATION EXAMPLE ID | MODIFICATION COMPONENT | |
| 20111220#1 | FLOW(ID:2) | "Lending Information Is Input"→ "Lending Information Is Unauthorized?" |
| 20090101#1 | FLOW(ID:2) | "Analysis Sample Is Input"→ "Analysis Sample Is Put on Centrifugal Separator" |

FIG. 19

| APPLICATION EXAMPLE ID | TAG ID | WORD |
|---|---|---|
| 20111220 #1 | 20111220 #1-1 | LENDING INFORMATION, UNAUTHORIZED |
| | 20111220 #1-2 | LENDING INFORMATION, UNAUTHORIZED, INPUT |
| | 20111220 #1-3 | LENDING INFORMATION, UNAUTHORIZED |
| | 20111220 #1-4 | LENDING INFORMATION, UNAUTHORIZED, INPUT |
| 20090101 #1 | 20090101 #1-1 | ANALYSIS SAMPLE, CENTRIFUGAL SEPARATOR |
| | 20090101 #1-2 | ANALYSIS SAMPLE, CENTRIFUGAL SEPARATOR, CONFIRMATION |
| | 20090101 #1-3 | INPUT, ANALYSIS SAMPLE, CENTRIFUGAL SEPARATOR |

FIG. 20

| DIFFERENCE ID | TAG ID | ADDITION/ MODIFICATION | COMPONENT | DETAIL | WORD |
|---|---|---|---|---|---|
| 20111220 | 20111220 #1-1 | ADDITION | BRANCH (ID:4) | "Lending Information Is Unauthorized?" | LENDING INFORMATION, UNAUTHORIZED |
| | 20111220 #1-2 | ADDITION | CONDITIONAL FLOW (ID:5) | "Lending Information Is Unauthorized?""Lending Information Is Input" | LENDING INFORMATION, UNAUTHORIZED |
| | 20111220 #1-3 | ADDITION | CONDITIONAL FLOW (ID:6) | "Lending Information Is Unauthorized?""End" | LENDING INFORMATION, UNAUTHORIZED |
| | 20111220 #1-4 | MODIFICATION | FLOW (ID:2) | "Lending Information Is Input""Lending Information Is Unauthorized?" | LENDING INFORMATION, UNAUTHORIZED |
| 20090101 | 20090101 #1-1 | ADDITION | ACTIVITY (ID:4) | "Analysis Sample Is Put on Centrifugal Separator" | ANALYSIS SAMPLE, CENTRIFUGAL SEPARATOR |
| | 20090101 #1-2 | ADDITION | FLOW (ID:5) | "Analysis Sample Is Put on Centrifugal Separator""Analysis Sample Is Confirmed" | ANALYSIS SAMPLE, CENTRIFUGAL SEPARATOR |
| | 20090101 #1-3 | MODIFICATION | FLOW (ID:2) | "Analysis Sample Is Input""Analysis Sample Is Put on Centrifugal Separator" | ANALYSIS SAMPLE, CENTRIFUGAL SEPARATOR |

FIG. 32

| LENDING | | |
|---|---|---|
| LENDING DATE: | 2011/6/21 | |
| LENDER: | YAMADA | SEARCH |
| TITLE: | INTRODUCTION TO DEVELOPMENT | |
| ADD | CANCEL | |

FIG. 33

1. If no Flow Exists between Task " Is Input" and End Terminal "End", Task " Is Input" Is Deleted, and 2 and 3 Are not Executed.

2. Branch " Is Unauthorized?" Is Inserted Between Task " Is Input" and End Terminal "End".

3. As for Branch " Is Unauthorized?", Branch Destination at Time of Affirmation Is Set to Task " Is Input" and Branch Destination at Time of Negation Is Set to End Terminal "End".

CREATION DEVICE, CREATION METHOD, AND RECORDING MEDIUM

CROSS-REFERENCE TO RELATED APPLICATION

This application is based upon and claims the benefit of priority of the prior Japanese Patent Application No. 2012-183576, filed on Aug. 22, 2012, the entire contents of which are incorporated herein by reference.

FIELD

The embodiments discussed herein are related to a creation device, a creation method, and a recording medium.

BACKGROUND

In recent years, various kinds of techniques for developing business applications have been produced. For example, a technique has existed that is used for creating a business application using a business data model and a business flow model, defined by a developer.

FIG. 30, FIG. 31, and FIG. 32 are diagrams for explaining an example of a technique of the related art, used for creating a business application. FIG. 30 illustrates an example of a business data model defined by a developer. In addition, FIG. 31 illustrates an example of a business flow model defined by the developer.

An entity "Lending" in the business data model illustrated by the example of FIG. 30 indicates the set of data to be input to a terminal by a lender who lends out a book, in a service in a library where the book is lent out. The entity "Lending" includes various kinds of data such as the lending date of the book, the name of the lender who lends out the book, and the title of the lent book. In addition, an entity "member" indicates the set of data relating to a member who borrows a book. The entity "member" includes various kinds of data such as the member ID of the member who borrows a book, the name of the member, and the address of the member.

The business flow model illustrated in FIG. 31 indicates, for example, the business flow of a lender of a book in a library. The business flow model illustrated in FIG. 31 indicates that when a book is lent to a member, a lender inputs, to a terminal, the set of data ("Lending" information) indicated by the entity "Lending". In addition, the business flow model in FIG. 31 indicates that after the lender has input the "Lending" information to the terminal, the terminal verifies whether or not the "Lending" information is unauthorized information. Here, the business flow model in FIG. 31 indicates that when the "Lending" information is unauthorized information, the lender inputs the "Lending" information to the terminal again. In addition, the business flow model in FIG. 31 indicates that when the "Lending" information is not unauthorized information, the business flow is terminated.

A technique of the related art, used for creating a business application, creates the business application using a business data model and a business flow model. For example, a technique of the related art, used for creating a business application, creates the business application using the business data model illustrated in FIG. 30 and the business flow model illustrated in FIG. 31. The created business application is executed by the terminal. As illustrated in the example of FIG. 32, the business application executed by the terminal creates a screen used for inputting the "Lending" information, and causes the screen to be displayed in a display device. In addition, when an "add" button is held down after a lending date, a lender, and a title have been input to the items of "Lending Date", "Lender", and "Title" in the displayed screen, respectively, the business application performs the following processing operation. In other words, the business application verifies whether or not the pieces of information of the lending date, the lender, and the title, which have been input, are pieces of unauthorized information. In addition, when the pieces of information of the lending date, the lender, and the title, which have been input, are pieces of unauthorized information, the business application discards the registration contents of the items of "Lending Date", "Lender", and "Title", and prompts the lender to input again.

In addition, there has been a technique for creating a new business flow model by applying a difference module to a business flow model. Here, an example of a difference module will be described. A difference module includes an application condition where the condition of a component in a business flow model to which the difference module is to be applied is described, and an application effect where a component in the business flow model when the difference module is applied is described. FIG. 33 is a diagram illustrating an example when a difference module is schematically illustrated. In a difference module serving as the example of FIG. 33, a case is illustrated where a condition that a task of a business flow model, "Is Input" (: an arbitrary character string, a wild card), is connected to an end terminal "End" is described as an application condition. In addition, in the difference module serving as the example of FIG. 33, there is described an application effect that when a component in a business flow model satisfies an application condition, the following task is inserted between the task "Is Input" and the end terminal "End". In other words, in the difference module serving as the example of FIG. 33, there is described an application effect that a task of branch "Is Unauthorized?" (: an arbitrary character string, a wild card) is inserted. In addition, in the difference module serving as the example of FIG. 33, there is described an application effect that a branch destination at the time of the affirmation of the task of branch is set to the task "Is Input" and a branch destination at the time of the negation thereof is set to the end terminal "End".

FIG. 34 is a diagram illustrating an example of a business flow model. Here, a case will be described where the difference module serving as the example of FIG. 33 is applied to the business flow model illustrated in FIG. 34. In the business flow model illustrated in the example of FIG. 34, a task "Lending Information Is Input" is connected to the end terminal "End". Therefore, a component in the business flow model illustrated in the example of FIG. 34 satisfies the application condition described in the difference module serving as the example of FIG. 33. Since satisfying the application condition, the difference module serving as the example of FIG. 33 turns out to be applied to the business flow model illustrated in the example of FIG. 34. FIG. 35 is a diagram illustrating an example of a business flow model after the difference module has been applied. As illustrated in the example of FIG. 35, when the difference module serving as the example of FIG. 33 has been applied to the business flow model illustrated in the example of FIG. 34, a task of branch "Lending Information Is Unauthorized?" is inserted between the task "Lending Information Is Input" and the end terminal "End". In addition, as illustrated in the example of FIG. 35, a branch destination at the time of the affirmation of the task of branch is set to the task "Lending Information Is Input" and a branch destination at the time of the negation thereof is set to the end terminal "End".

Using such a method as described above, a technique of the related art, used for creating a business flow model, creates a new business flow model by applying a difference module to a business flow model.

In addition, there has exited a related technique where a person in charge of development registers the deliverables of a document and a program with adding thereto tag information indicating the relation of design information, and manages the assets of the document and the program. Japanese Laid-open Patent Publication No. 2008-123432 is an example of such a related technique.

Incidentally, it may be considered that a difference module applied to a business flow model is reused and applied to another business flow model. For example, it may be considered that a storage device is caused to store therein a plurality of difference modules and the developer of a business flow model acquires a desired difference module from the storage device and applies the acquired difference module to another business flow model. In this case, it may be considered that the developer attaches a tag used for search to each of the difference modules so as to efficiently acquire a difference module. However, a large number of difference modules tend to exist that are reused for a small number of business flow models. Therefore, there is a problem that it may be difficult for the developer to attach a tag to each of a large number of difference modules.

In addition, a method may also be considered where a tag used for searching for a difference module is automatically created using a character string described in the difference module. However, for example, as illustrated in the example of FIG. 33, a wild card or the like is described in the difference module, and in a case where a tag is created using the wild card, since the character string of the tag is arbitrary, the created tag turns out to match a large number of search character strings. Therefore, when a tag used for searching for a difference module is created using a character string described in a difference module, it may be difficult to search for a difference module desired by the developer, using the created tag.

In addition, such a problem is not limited to the case where the tag used for searching for a difference module is created, and in the same way, such a problem also exists when tags used for searching for many kinds of software or various documents are created.

SUMMARY

According to an aspect of the invention, a creation device includes a memory and a processor coupled to the memory. The processor is configured to: determine an additional component serving as a component added to a second model owing to application of a module, and a modification component serving as a modified component in a third model, on the basis of the second model and the third model, wherein a condition, in at least a portion of which a wild card is described, and a first model are described in the module, the first model serving as a model when the module is applied to a model satisfying the condition and serving as a model including a variable in which a character string in a model satisfying the condition is stored, the character string corresponding to the wild card, and the third model is a model when the module is applied to the second model satisfying the condition and where a character string in the second model, which corresponds to the wild card, is stored in a variable, extract a word from the additional component and the modification component, on the basis of a word occurring in a fourth model to which a module, different from the module in which the condition and the first model are described, is applied, and the extracted word, calculate a degree indicating that the number of times the word occurs in the third model is high and indicating that the number of times the word occurs in the fourth model is low, and create, on the basis of the degree, a tag corresponding to the module in which the condition and the first model are described, the tag including a word where the number of times the word occurs in the third model is greater than or equal to a first predetermined value and the number of times the word occurs in the fourth model is less than or equal to a second predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a data structure of a search condition the second terminal transmits to a server;

FIG. 11 is a diagram illustrating examples of various kinds of data the second terminal transmits to a server;

FIG. 13 is a diagram illustrating an example of a data structure of a difference module DB;

FIG. 14 is a diagram illustrating an example of a data structure of a tag DB;

FIG. 15 is a diagram illustrating an example of a data structure of an application example DB;

FIG. 16 is a diagram for explaining an example of processing executed by a tag registration unit according to the present embodiment;

FIG. 17 is a diagram illustrating an example of a registration content of a tag DB;

FIG. 18 is a diagram for explaining an example of processing executed by a determination unit according to the present embodiment;

FIG. 19 is a diagram illustrating an example of a correspondence relationship between a tag ID and an extracted word;

FIG. 20 is a diagram illustrating an example of a tag DB to which a registration content is added by a creation unit according to the present embodiment;

FIG. 32 is a diagram for explaining an example of a technique for creating a business application of the related art;

FIG. 33 is a diagram illustrating an example when a difference module is schematically illustrated;

DESCRIPTION OF EMBODIMENTS

Hereinafter, the individual embodiments of a creation device, a creation method, and a recording medium recording therein a creation program, disclosed in the present application, will be described in detail on the basis of drawings. In addition, the individual embodiments do not limit the disclosed technology. In addition, the individual embodiments may be arbitrarily combined insofar as processing contents do not conflict with one another.

First Embodiment

Example of Configuration of System 10

Figure 1:
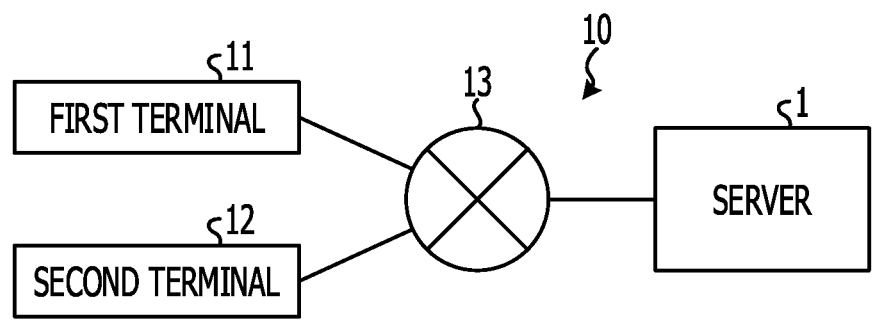
FIG. 1 is a diagram illustrating a system according to a first embodiment.

A system will be described to which a server according to a first embodiment is applied. FIG. 1 is a diagram illustrating a system according to the first embodiment. As illustrated in FIG. 1, a system 10 includes a server 1, a first terminal 11, and a second terminal 12. The server 1, the first terminal 11, and the second terminal 12 are connected to one another through a network 13. In other words, it may be possible for the server 1, the first terminal 11, and the second terminal 12 to communicate with one another.

In the first terminal 11, a program having a function for creating a difference module is installed. By executing the installed program, the first terminal 11 creates a difference module. In addition, the first terminal 11 transmits the created difference module to the server 1 through the network 13.

Figure 2:
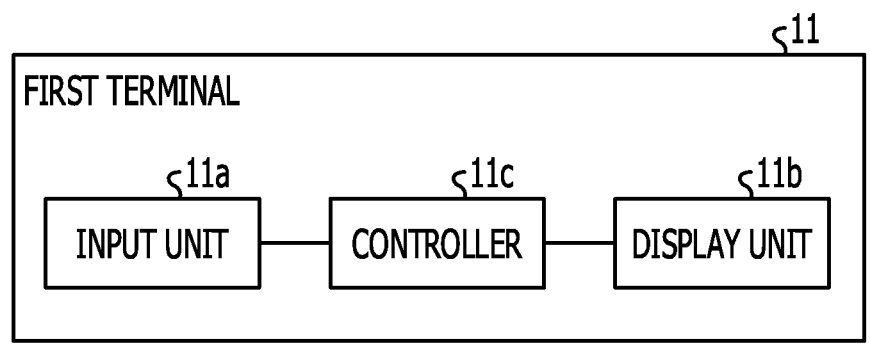
FIG. 2 is a diagram illustrating an example of a functional configuration of a first terminal.

FIG. 2 is a diagram illustrating an example of the functional configuration of a first terminal. As illustrated in FIG. 2, the first terminal 11 includes an input unit 11a, a display unit 11b, and a controller 11c.

The input unit 11a receives an operation due to a user, and transmits the content of the received operation to the controller 11c. The input unit 11a is, for example, a device such as a mouse or a keyboard.

The display unit 11b displays various types of information. For example, owing to the control of the controller 11c, the display unit 11b displays a screen used for creating a difference module.

Figure 3:
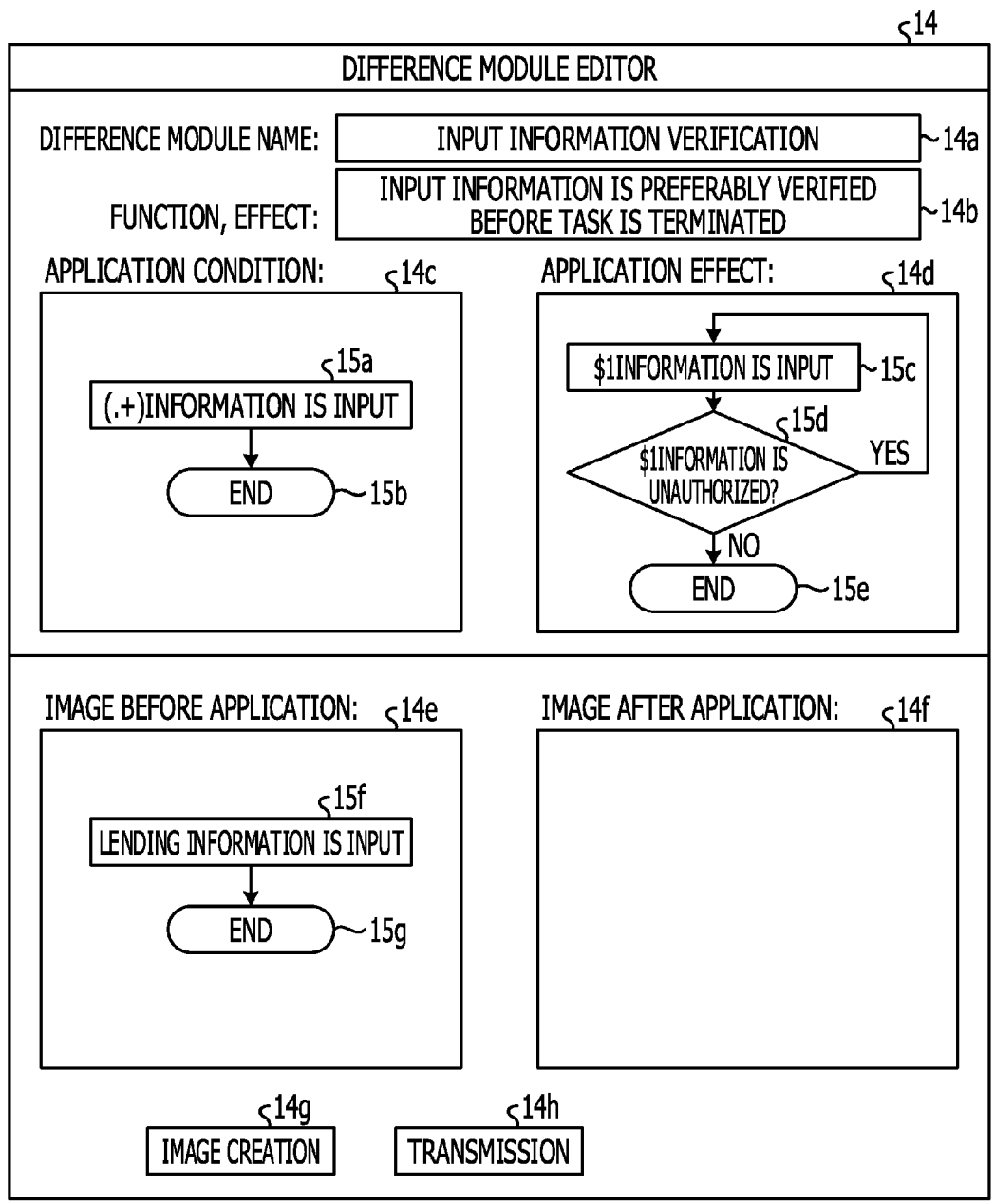
FIG. 3 is a diagram illustrating an example of a screen used for creating a difference module.

FIG. 3 is a diagram illustrating an example of a screen used for creating a difference module. The name of a screen 14 illustrated in the example of FIG. 3 and used for creating a difference module is "Difference Module Editor". As illustrated in the example of FIG. 3, the screen 14 includes items 14a to 14e, a display area 14f, an image creation button 14g, and a transmission button 14h. In the item 14a, the name (title) of a difference module to be newly created is registered. The example of FIG. 3 illustrates a case where, as the name of the difference module to be newly created, "Input Information Verification" has been registered in the item 14a by a user of the first terminal 11 through the input unit 11a.

In the item 14b, the function and effect of the difference module to be newly created are registered. The example of FIG. 3 illustrates a case where, as the function and effect of the difference module to be newly created, "Input Information Is Preferably Verified before Task Is Terminated" has been registered by the user through the input unit 11a.

In the item 14c, the application condition of the difference module to be newly created is registered. The application condition indicates, for example, the configuration of components in a business flow model to which the difference module to be newly created is applied and a character string described in each component. In other words, the difference module to be newly created is applied to a business flow model satisfying two conditions described next. The first condition is a condition that a business flow model includes the configuration of components coinciding with the configuration of components registered in the item 14c. The second condition is a condition that, from among individual components in the business flow model satisfying the first condition, a character string described in a component corresponding to the component registered in the item 14c coincides with a character string described in the component registered in the item 14c. Here, in some cases, a wild card may be used as a portion of the character string described in the component in a business flow model registered in the item 14c. In this case, it may be possible to apply the difference module to be newly created to a plurality of business flow models in each of which the configuration of components is the same while a portion of a character string described in the component is different.

The example of FIG. 3 indicates a case where, from a palette (not illustrated) in which a plurality of components in a business flow model are registered, the user has selected components 15a and 15b to be registered in the item 14c, through the input unit 11a, and has moved the selected components 15a and 15b to the item 14c. In addition, the example of FIG. 3 indicates a case where the user has described "(.+) Information Is Input" in the component 15a through the input unit 11a. In addition, "(.+)" indicates a wild card. In addition, as for the component 15b, "End" has been preliminarily described when the component 15b has been registered in the palette. In addition, the example of FIG. 3 indicates a case where, through the input unit 11a, the user has drawn an arrow heading from the component 15a to the component 15b.

In the item 14d, the application effect of the difference module to be newly created is registered. The application effect indicates, for example, components in a business flow model after the difference module has been applied to components in the business flow model satisfying the application condition. Here, in some cases, a variable may be used as a portion of a character string described in a component in a business flow registered in the item 14d. In this variable, a character string in a portion corresponding to the wild card is stored from a character string of a component in the business flow model to which the difference module has been applied and which satisfies the application condition.

The example of FIG. 3 indicates a case where, from the above-mentioned palette, the user has selected components 15c, 15d, and 15e to be registered in the item 14d, through the input unit 11a, and has moved the selected components 15c, 15d, and 15e to the item 14d. In addition, the example of FIG. 3 indicates a case where the user has described "$1 Information Is Input" in the component 15c through the input unit 11a. In addition, "$1" indicates a variable in which a character string corresponding to the above-mentioned wild card "(.+)" is stored. In addition, the example of FIG. 3 indicates a case where, through the input unit 11a, the user has described "$1 Information Is Unauthorized?" in the component 15d indicating a branch. In addition, as for the component 15e, "End" has been preliminarily described when the component 15e has been registered in the palette. In addition, the example of FIG. 3 indicates a case where, through the input unit 11a, the user has drawn an arrow heading from the component 15c to the component 15d. In addition, the example of FIG. 3 indicates a case where, through the input unit 11a, the user has drawn an arrow from the component 15d to the component 15c, the arrow indicating that the branch destination of the affirmation of the component 15d is the component 15c. In addition, the example of FIG. 3 indicates a case where, through the input unit 11a, the user has drawn an arrow from the component 15d to the component 15e, the arrow indicating that the branch destination of the negation of the component 15d is the component 15e.

In the item 14e, an example of a component in a business flow model to which the difference module to be newly created is applied is registered. The example of FIG. 3 indicates a case where, from the above-mentioned palette, the user has selected components 15f and 15g to be registered in the item 14e, through the input unit 11a, and has moved the selected components 15f and 15 to the item 14e. In addition, the example of FIG. 3 indicates a case where the user has described "Lending Information Is Input" in the component 15f through the input unit 11a. In addition, as for the component 15g, "End" has been preliminarily described when the component 15g has been registered in the palette. In addition, the example of FIG. 3 indicates a case where, through the input unit 11a, the user has drawn an arrow heading from the component 15f to the component 15g.

In the display area 14f, owing to the control of the controller 11c, a component in the business flow model to which the difference module to be newly created has been applied and which is registered in the item 14e is displayed.

The controller 11c controls the operation of the first terminal 11. For example, the controller 11c executes an installed program, and controls the display unit 11b so as to display a screen used for creating a difference module. Here, a case will be described where the controller 11c causes the display unit 11b to display the above-mentioned screen 14, as the screen used for creating a difference module. When information has been registered in each of the items 14a to 14e, the input unit 11a has been operated by the user, and the image creation button 14g has been held down by the user, the controller 11c performs the following processing operation. In other words, the controller 11c judges whether or not the component registered in the item 14e satisfies the application condition registered in the item 14c. When the application condition is not satisfied, the controller 11c controls the display of the display unit 11b so that an error display is performed in the display area 14f, the error display indicating the effect of prompting reregistration in the item 14e.

On the other hand, when the application condition is satisfied, the controller 11c acquires a character string corresponding to the wild card described in the component registered in the item 14c, from among character strings described in the components registered in the item 14e. In addition, the controller 11c acquires the application effect registered in the item 14d. In addition, the controller 11c stores the acquired character string in a variable described in a component in the acquired application effect. Subsequently, the controller 11c controls the display of the display unit 11b so that the application effect including the component where the character string is stored in the variable is displayed in the display area 14f.

Figure 4:
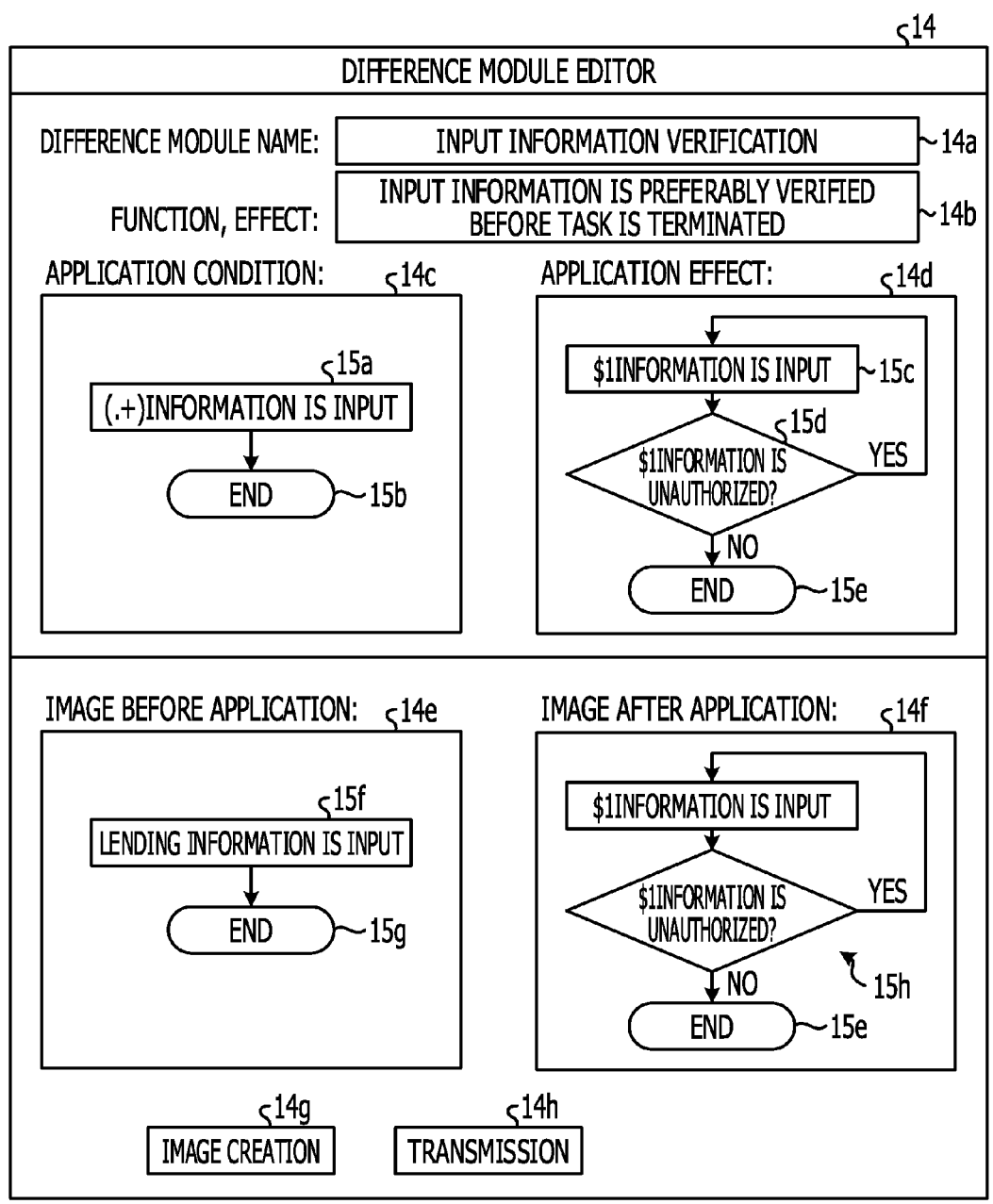
FIG. 4 is a diagram illustrating an example when an application effect including a component where a character string is stored in a variable is displayed in a display area of a screen used for creating a difference module.

With reference to FIG. 3 and FIG. 4, an example of processing the controller 11c executes will be described. FIG. 4 is a diagram illustrating an example when an application effect including a component where a character string is stored in a variable is displayed in a display area of a screen used for creating a difference module. As illustrated in the example of FIG. 3, when various types of information have been registered in the items 14a to 14e, the input unit 11a has been operated by the user, and the image creation button 14g has been held down by the user, the controller 11c performs the following processing operation. In other words, the controller 11c judges that the component registered in the item 14e satisfies the application condition registered in the item 14c. In addition, from among character strings described in the components 15f and 15g registered in the item 14e, the controller 11c acquires a character string "Lending" corresponding to the wild card described in the component registered in the item 14c. In addition, the controller 11c acquires the application effect registered in the item 14d. In addition, the controller 11c stores the acquired character string "Lending", in the variable "$1" described in the component in the acquired application effect. Subsequently, as illustrated in the example of FIG. 4, the controller 11c controls the display of the display unit 11b so that an application effect 15h including a component where the character string "Lending" is stored in the variable "$1" is displayed in the display area 14f. Accordingly, it may be possible for the controller 11c to present, to the user, an example of a business flow model to which the difference module to be newly created has been applied.

Figure 5:
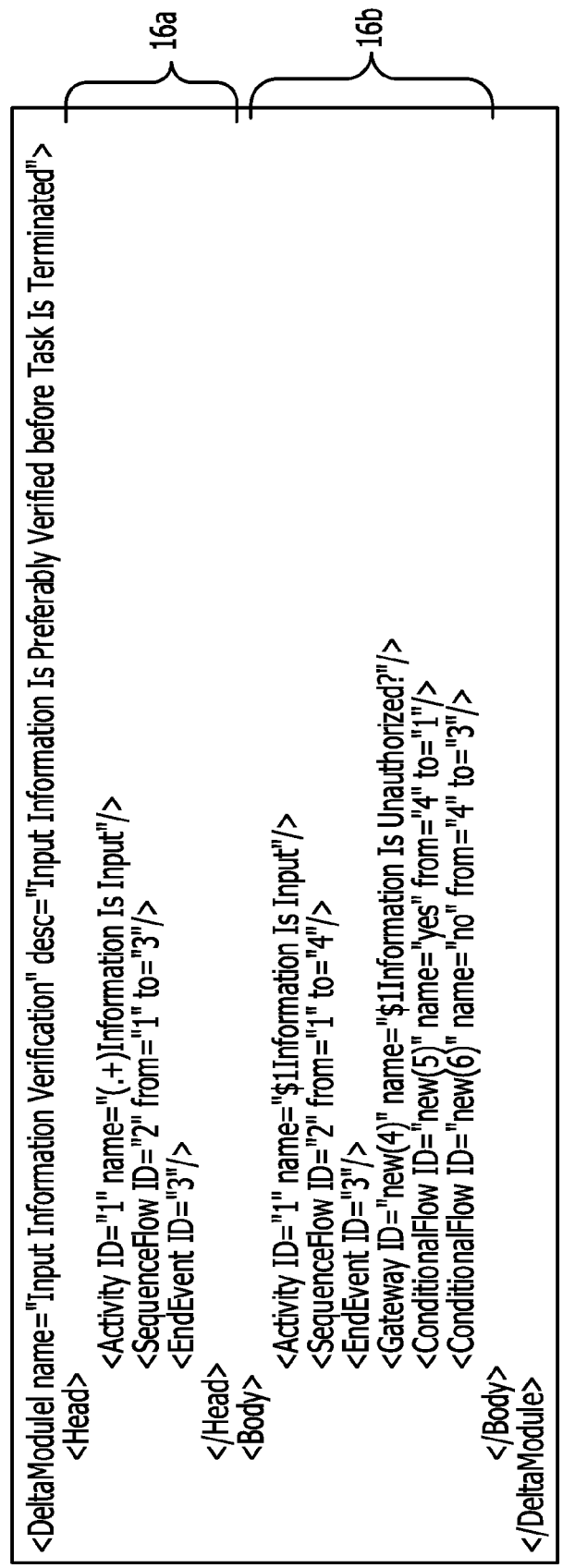
FIG. 5 is a diagram illustrating an example of a difference module transmitted to a server.

After that, when the transmission button 14h has been held down, the controller 11c transmits, to the server 1 through the network 13, a difference module including the registration content of each item of the items 14a to 14d. FIG. 5 is a diagram illustrating an example of a difference module transmitted to a server. As illustrated in the example of FIG. 5, the difference module is, for example, data having the format of an extensible markup language (XML), and includes the registration content of each item of the items 14a to 14d. The example of FIG. 5 illustrates a case where the registration content "Input Information Verification" of the item 14a illustrated in FIG. 3 is set in the item of the "name (name)" of a "Delta Module (difference module)". In addition, the example of FIG. 5 illustrates a case where the registration content "Input Information Is Preferably Verified before Task Is Terminated" of the item 14b illustrated in FIG. 3 is set in the item of the "desc (description)" of the "Delta Module".

In addition, the example of FIG. 5 illustrates a case where the application condition registered in the item 14c illustrated in FIG. 3 is described as the application condition 16a of the "Delta Module" using the format of the XML. A component that is included in the application condition 16a in the example of FIG. 5 and whose "ID" is "1" corresponds to the component 15a illustrated in FIG. 3. In addition, a component that is included in the application condition 16a and whose "ID" is "2" corresponds to the arrow drawn from the component 15a to the component 15b illustrated in FIG. 3. In addition, a component that is included in the application condition 16a and whose "ID" is "3" corresponds to the component 15b illustrated in FIG. 3.

In addition, the example of FIG. 5 illustrates a case where the application effect registered in the item 14d illustrated in FIG. 3 is described as the application effect 16b of the "Delta Module" using the format of the XML. A component that is included in the application effect 16b in the example of FIG. 5 and whose "ID" is "1" corresponds to the component 15c illustrated in FIG. 3. In addition, a component that is included in the application effect 16b and whose "ID" is "2" corresponds to the arrow drawn from the component 15c to the component 15d illustrated in FIG. 3. In addition, a component that is included in the application effect 16b and whose "ID" is "3" corresponds to the component 15e illustrated in FIG. 3. A component that is included in the application effect 16b and whose "ID" is "4" corresponds to the component 15d illustrated in FIG. 3. In addition, a component that is included in the application effect 16b and whose "ID" is "5" corresponds to the arrow drawn from the component 15d to the component 15c, as the branch destination of the affirmation of the component 15d illustrated in FIG. 3. In addition, a component that is included in the application effect 16b and whose "ID" is "6" corresponds to the arrow drawn from the component 15d to the component 15e, as the branch destination of the negation of the component 15d illustrated in FIG. 3. As described above, the controller 11c transmits such a difference module as illustrated in the example of FIG. 5, to the server 1 through the network 13.

A program having a function for applying a difference module to a business flow model is installed into the second terminal 12. By executing the installed program, the second terminal 12 applies the difference module to the business flow model. In addition, the second terminal 12 transmits, to the server 1 through the network 13, information indicating the business flow model before the difference module is applied and information indicating the business flow model after the difference module has been applied.

Figure 6:
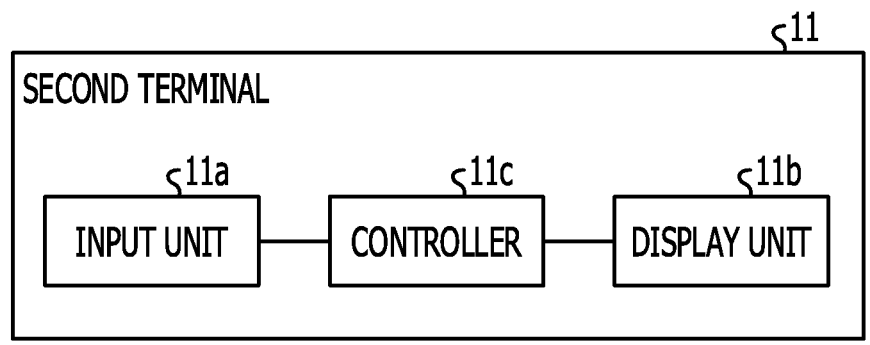
FIG. 6 is a diagram illustrating an example of a functional configuration of a second terminal.

FIG. 6 is a diagram illustrating an example of the functional configuration of a second terminal. As illustrated in FIG. 6, the second terminal 12 includes an input unit 12a, a display unit 12b, and a controller 12c.

The input unit 12a receives an operation due to a user, and transmits the content of the received operation to the controller 12c. The input unit 12a is, for example, a device such as a mouse or a keyboard.

The display unit 12b displays various types of information. For example, owing to the control of the controller 12c, the display unit 12b displays the following screen. In other words, the display unit 12b searches for a difference module, and displays a screen used for applying, to a business flow model, the difference module obtained as a result of the search.

Figure 7:
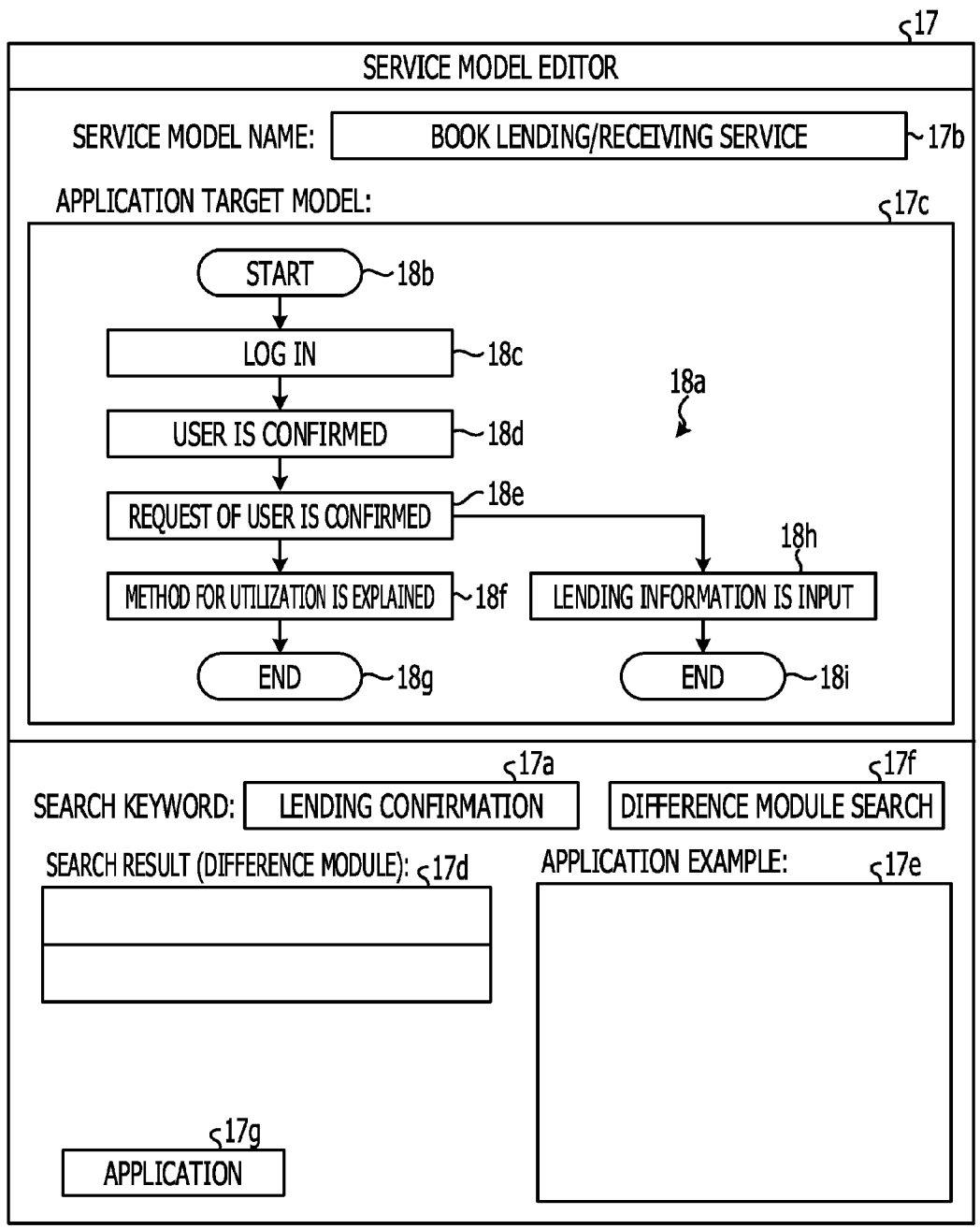
FIG. 7 is a diagram illustrating an example of a screen used for searching for a difference module and applying, to a business flow model, the difference module obtained as a result of the search.

FIG. 7 is a diagram illustrating an example of a screen used for searching for a difference module and applying, to a business flow model, the difference module obtained as a result of the search. The name of a screen 17 illustrated in the example of FIG. 7 is "Service Model Editor". As illustrated in the example of FIG. 7, the screen 17 includes an item 17a, display areas 17b to 17e, a difference module search button 17f, and an application button 17g. A keyword used for search when a difference module is searched for is input to the item 17a. The example of FIG. 7 illustrates a case where "Lending" and "Confirmation" have been input, as the keywords used for search, to the item 17a by the user of the second terminal 12 through the input unit 12a.

In the display area 17b, owing to the control of the controller 12c, the name of a business flow model to which a difference module is to be applied is displayed. In addition, in the display area 17c, owing to the control of the controller 12c, the business flow model to which the difference module is to be applied is displayed. Here, in the second terminal 12, a plurality of business flow models created by the user are stored in a storage unit (not illustrated). When, through the input unit 12a, the user has selected the business flow model to which the difference module is to be applied, from among the business flow models stored in the storage unit, the controller 12c performs the following processing operation. In other words, the controller 12c causes the name of the selected business flow model to be displayed in the display area 17b, and causes the selected business flow model to be displayed in the display area 17c. The example of FIG. 7 illustrates a case where the name "Book Lending/Receiving Service" of a business flow model 18a that is selected by the user and to which a difference module is to be applied is displayed in the display area 17b. In addition, the example of FIG. 7 illustrates a case where the business flow model 18a whose name is "Book Lending/Receiving Service" is displayed in the display area 17c. In addition, the business flow model 18a includes components 18b to 18i.

Here, through the input unit 12a, the user may select a component to which the difference module is to be applied, from among the components in the business flow model displayed in the display area 17c. For example, through the input unit 12a, the user may select, as a component to which the difference module is to be applied, a component 18h from among the components 18b to 18i.

In the display area 17d, owing to the control of the controller 12c, the names of difference modules are displayed along with ranks, the difference modules being obtained as a result of search and transmitted from the server 1. Here, through the input unit 12a, the user may select the name of a difference module to be applied to the component displayed and selected in the display area 17c, from among the names of the difference modules displayed in the display area 17d. In addition, when the name of a difference module displayed in the display area 17d has been selected, a component is displayed in the display area 17e owing to the control of the controller 12c, the component being displayed and selected in the display area 17c and being a component to which the difference module whose name has been selected has been applied.

The controller 12c controls the operation of the second terminal 12. For example, by executing the installed program, the controller 12c searches for a difference module, and controls the display unit 12b so as to display a screen used for applying, to a business flow model, the difference module obtained by a result of the search. Here, a case will be described where the controller 12c searches for a difference module and causes the display unit 12b to display the above-mentioned screen 17, as a screen used for applying, to a business flow model, the difference module obtained by a result of the search.

First, as described above, when, through the input unit 12a, the user has selected a business flow model to which a difference module is to be applied, from among the business flow models stored in the storage unit, the controller 12c performs the following processing operation. In other words, the controller 12c causes the name of the selected business flow model to be displayed in the display area 17b and causes the selected business flow model to be displayed in the display area 17c. For example, as illustrated in the example of FIG. 7, the controller 12c causes the name "Book Lending/Receiving Service" of the selected business flow model 18a to be displayed in the display area 17b, and causes the selected business flow model 18a to be displayed in the display area 17c.

In addition, when the difference module search button 17f has been held down, the controller 12c acquires the ID of a component displayed and selected in the display area 17c. In addition, the controller 12c converts the business flow model displayed in the display area 17c into data having the format of an XML. In addition, the controller 12c sets, in one file, the data having the format of an XML, obtained as a result of the conversion, a keyword used for search, input to the item 17a, and the acquired ID, and transmits the file, as a search condition, to the server 1 through the network 13. FIG. 8 is a diagram illustrating an example of the data structure of a search condition the second terminal transmits to a server. The search condition illustrated in the example of FIG. 8 includes individual items serving as "Search Keyword", "Selection Component ID", and "Application Target Model". In the item "Search Keyword", a keyword used for search, input to the item 17a, is set. The example of FIG. 8 illustrates a case where keywords used for search, which serve as "Lending" and "Confirmation", are set in the item "Search Keyword". In addition, in the item "Selection Component ID", the ID of a component displayed and selected in the display area 17c is set. The example of FIG. 8 illustrates a case where the ID "1" of the component 18h selected by the user is set in the item "Selection Component ID". In addition, in the item "Application Target Model", the XML-format data of a business flow model displayed in the display area 17c is set. The example of FIG. 8 illustrates a case where the XML-format data of the business flow model 18a illustrated in the example of FIG. 7 is set in the item "Application Target Model".

Figure 9:
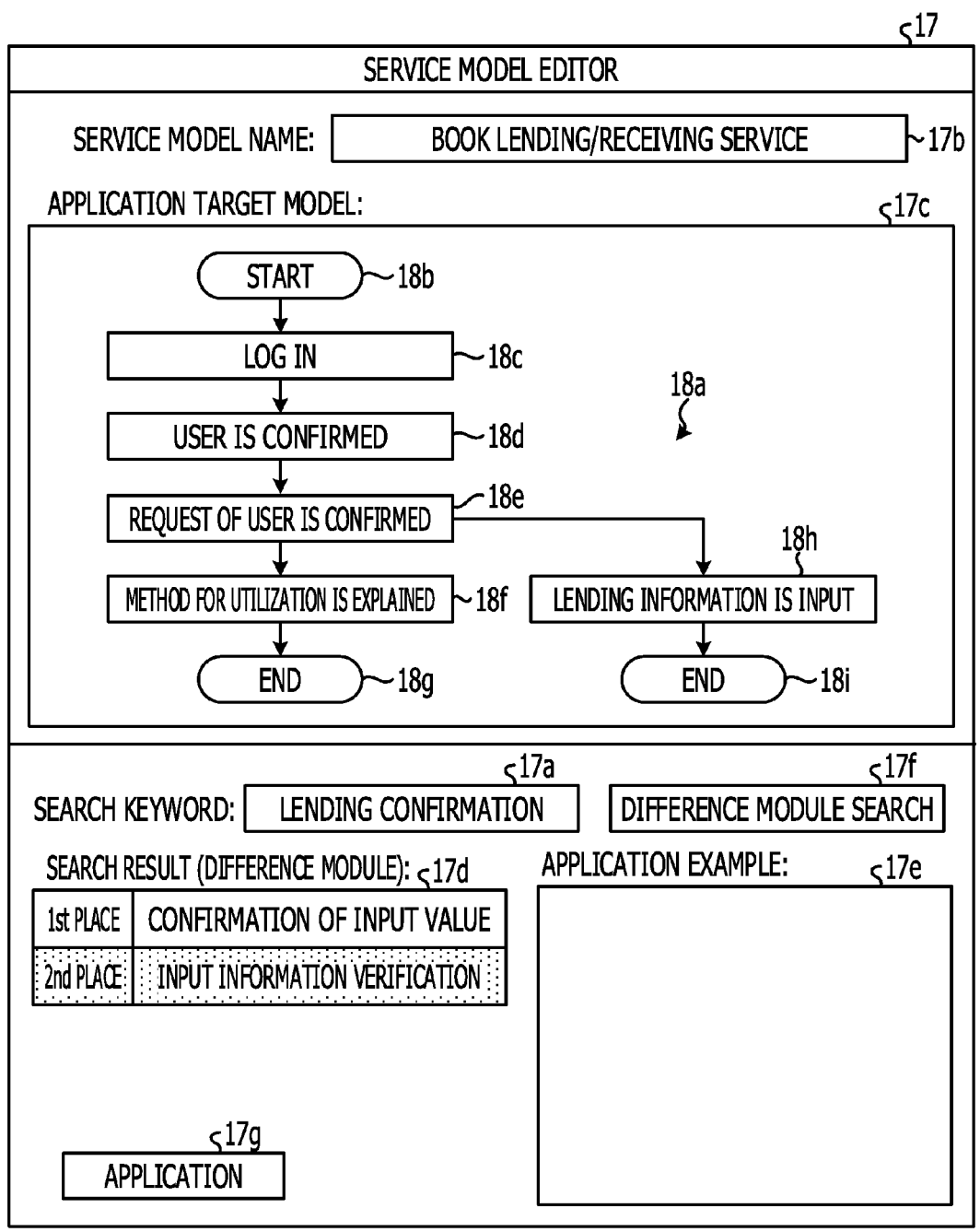
FIG. 9 is a diagram illustrating an example when names of difference modules obtained as a result of search are displayed along with ranks.

In addition, when having received the XML-format data of a difference module obtained as a result of search, a difference ID serving as the ID of such a difference module, and the rank of a difference module indicated by the difference ID, which have been transmitted from the server 1, the controller 12c performs the following processing operation. In other words, the controller 12c controls the display unit 12b so as to display the name of the received difference module in the display area 17d along with a rank. FIG. 9 is a diagram illustrating an example when the names of difference modules obtained as a result of search are displayed along with ranks. In the example of FIG. 9, the controller 12c causes the name "Confirmation of Input Value" of a difference module to be displayed in the display area 17d with being associated with a rank "1st place". In addition, in the example of FIG. 9, the controller 12c causes the name "Input Information Verification" of the difference module to be displayed in the display area 17d with being associated with a rank "2nd place".

Figure 10:
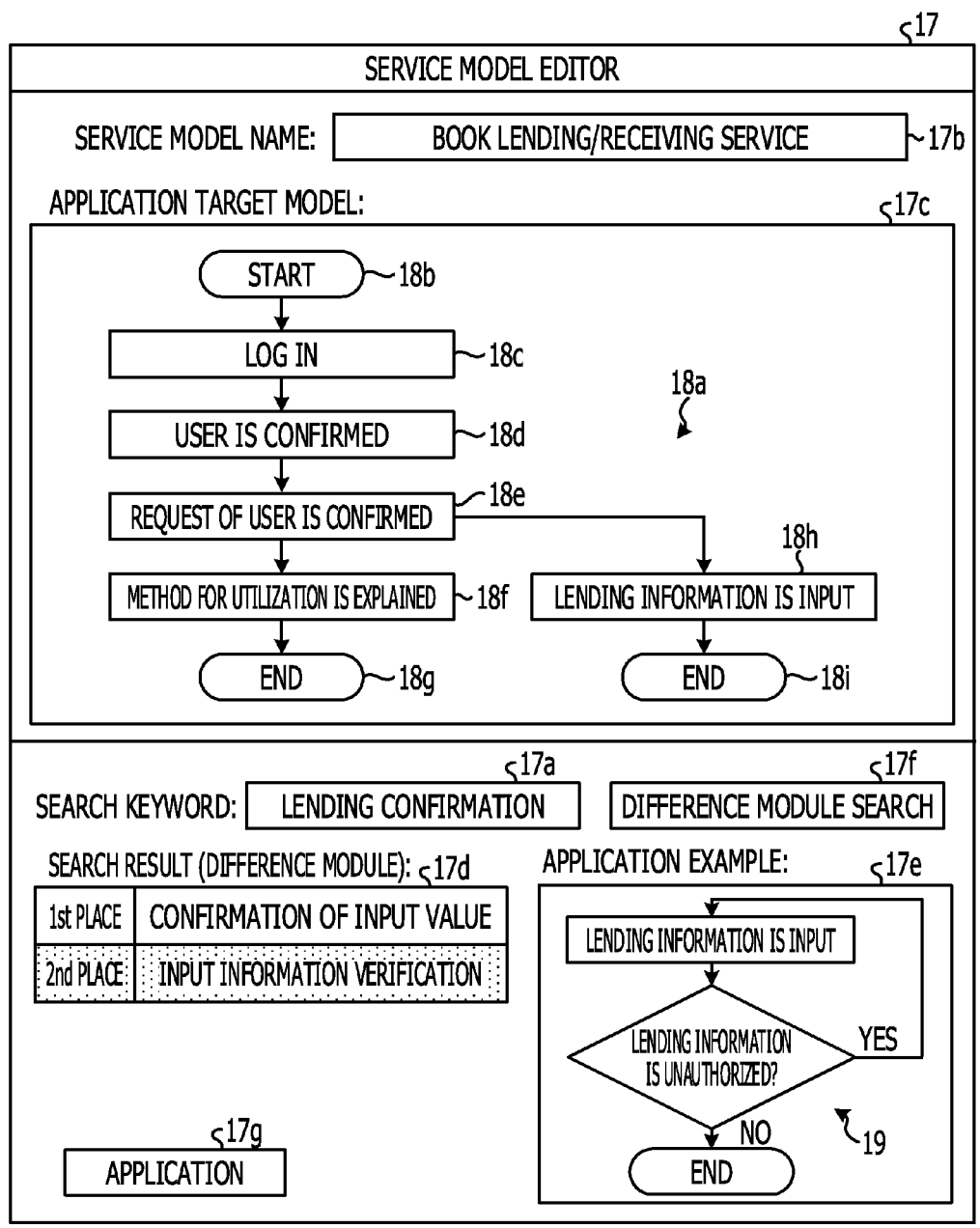
FIG. 10 is a diagram illustrating an example when an application example is displayed.

In addition, in the controller 12c, every time the name of a difference module displayed in the display area 17d is selected by the user, the controller 12c performs the following processing operation. In other words, the controller 12c applies a difference module, whose name has been selected, to a business flow model including the component displayed and selected in the display area 17c, and creates, as an application example, the business flow model to which the difference module has been applied. In addition, the controller 12c controls the display unit 12b so that the created application example is displayed in the display area 17e. FIG. 10 is a diagram illustrating an example when an application example is displayed. For example, in the example of FIG. 9, when the "Input Information Verification" serving as the "2nd place" has been selected by the user, the controller 12c performs the following processing operation. In other words, the controller 12c applies the difference module whose name "Input Information Verification" has been selected, to the component 18h displayed and selected in the display area 17c, and creates a business flow model 19 including the component 18h to which the difference module has been applied. In addition, as illustrated in the example of FIG. 10, the controller 12c causes the business flow model 19 to be displaced in the display area 17e, as an application example 19. Accordingly, it may be possible for the controller 12c to present, to the user, an example of a business flow model to which the difference module has been applied.

In addition, when the application button 17g has been held down by the user through the input unit 12a, the controller 12c performs the following processing operation. In other words, the controller 12c calculates the number N of times the selected difference module has been applied. In addition, the controller 12c adds a symbol "#" to the end of the difference ID of the applied difference module, furthermore adds the calculated number N of times, and creates an application example ID. The application example ID is an ID used for identifying an application example. For example, when the controller 12c has newly applied a difference module indicated by a difference ID "20111220" and the number of times the difference module indicated by the difference ID "20111220" has been applied is "1", the controller 12c performs the following processing operation. In other words, the controller 12c creates an application example ID "20111220#1".

Subsequently, the controller 12c transmits, to the server 1, the difference ID of the applied difference module, the created application example ID, the XML-format data of the business flow model before the difference module is applied, and the XML-format data of the created application example. In addition, the XML-format data of the business flow model before the difference module is applied is the XML-format data of the business flow model displayed in the display area 17c. FIG. 11 is a diagram illustrating examples of various kinds of data the second terminal transmits to a server. The example of FIG. 11 illustrates a case where the controller 12c transmits, to the server 1, the difference ID "20111220" of the applied difference module. In addition, the example of FIG. 11 illustrates a case where the controller 12c transmits the application example ID "20111220#1" to the server 1. In addition, the example of FIG. 11 illustrates a case where the controller 12c transmits, to the server 1, the XML-format data of the business flow model 18a before the difference module indicated by the difference ID "20111220" is applied. In addition, the example of FIG. 11 illustrates a case where the controller 12c transmits, to the server 1, the XML-format data of the application example where the difference module indicated by the difference ID "20111220" is applied to the business flow model 18a.

Returning to the description of FIG. 1, when having received the difference module transmitted from the first terminal 11, the server 1 stores therein the received difference module. In addition, when having received the search condition transmitted from the second terminal 12, the server 1 searches for a difference module matching the received search condition, and transmits, to the second terminal 12, information relating to the difference module obtained as a result of the search. The server 1 is an example of a creation device.

Figure 12:
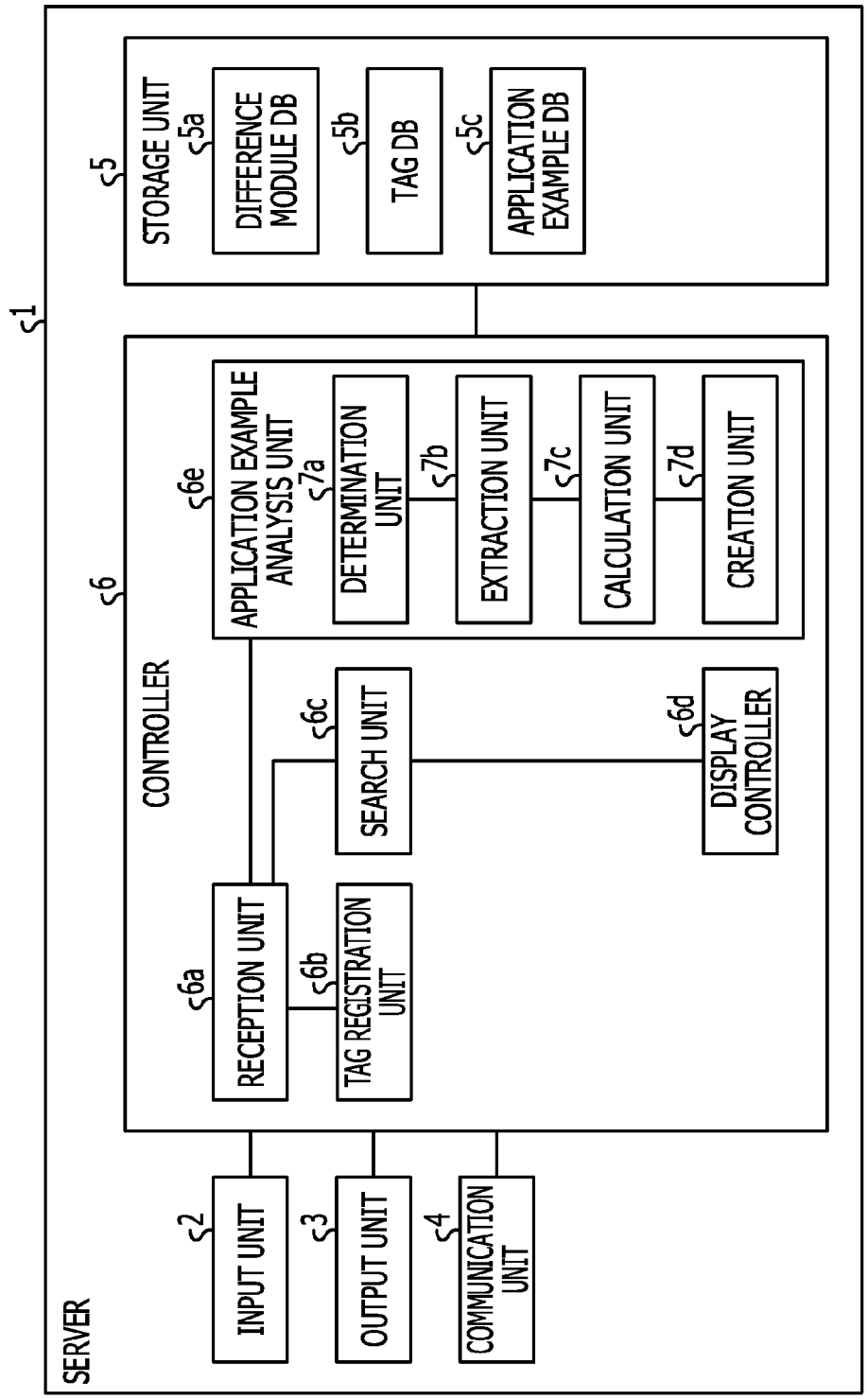
FIG. 12 is a diagram illustrating an example of a functional configuration of a server.

FIG. 12 is a diagram illustrating an example of the functional configuration of a server. As illustrated in FIG. 12, the server 1 includes an input unit 2, an output unit 3, a communication unit 4, a storage unit 5, and a controller 6.

The input unit 2 inputs various types of information to the controller 6. For example, the input unit 2 receives various kinds of operations from the administrator of the server 1, and so forth, and inputs the contents of the received operations to the controller 6. The input unit 2 is, for example, a device such as a keyboard or a mouse.

The output unit 3 outputs various types of information. For example, the output unit 3 displays an image indicating the operating state of the server 1. The output unit 3 is, for example, a display device such as a display.

The communication unit 4 is an interface used for communicating with the first terminal 11 and the second terminal 12. For example, when having received such a difference module as illustrated in the example of FIG. 5, transmitted from the first terminal 11, the communication unit 4 transmits the received difference module to the controller 6. In addition, when having received such a search condition as illustrated in the example of FIG. 8, transmitted from the second terminal 12, the communication unit 4 transmits the received search condition to the controller 6. In addition, when having received after-mentioned data where a difference ID, a rank, and the XML-format data of a difference module are associated with one another, the data being transmitted from the controller 6, the communication unit 4 transmits the received data to the second terminal 12. In addition, when having received such various kinds of data as illustrated in the example of FIG. 11, transmitted from the controller 6, the communication unit 4 transmits the received various kinds of data to the second terminal 12.

The storage unit 5 stores therein various types of information. For example, the storage unit 5 stores therein a difference module data base (DB) 5*a*, a tag DB 5*b*, and an application example DB 5*c*.

The difference module DB 5*a* is a database where a difference module is registered. In the difference module DB 5*a*, owing to an after-mentioned tag registration unit 6*b*, various types of information are registered that relate to a difference module created in the first terminal 11.

FIG. 13 is a diagram illustrating an example of the data structure of a difference module DB. For example, the difference module DB 5*a* illustrated in FIG. 13 includes an item 5*a*_1 "Difference ID", an item 5*a*_2 "Name", and an item 5*a*_3 "XML Representation".

In the item 5*a*_1 "Difference ID", a difference ID is registered that serves as an ID used for identifying a difference module. The example of FIG. 13 illustrates a case where the difference ID "19850527" of a difference module whose name is "Transfer of Authority" is registered in the item 5*a*_1 "Difference ID". In addition, the example of FIG. 13 illustrates a case where the difference ID "20090101" of a difference module whose name is "Confirmation of Input Value" is registered in the item 5*a*_1 "Difference ID". In addition, the example of FIG. 13 illustrates a case where the difference ID "20111220" of a difference module whose name is "Input Information Verification" is registered in the item 5*a*_1 "Difference ID".

In the item 5*a*_2 "Name", the name of a difference module is registered. The example of FIG. 13 illustrates a case where the name "Transfer of Authority" is registered in the item 5*a*_2 "Name". In addition, the example of FIG. 13 illustrates a case where the name "Confirmation of Input Value" is registered in the item 5*a*_2 "Name". In addition, the example of FIG. 13 illustrates a case where the name "Input Information Verification" is registered in the item 5*a*_2 "Name".

In the item 5*a*_3 "XML Representation", the XML-format data of a difference module is registered. The example of FIG. 13 illustrates a case where the XML-format data of the difference module whose name is "Transfer of Authority" is registered in the item 5*a*_3 "XML Representation". In addition, the example of FIG. 13 illustrates a case where the XML-format data of the difference module whose name is "Confirmation of Input Value" is registered in the item 5*a*_3 "XML Representation". In addition, the example of FIG. 13 illustrates a case where the XML-format data of the difference module whose name is "Input Information Verification" is registered in the item 5*a*_3 "XML Representation".

Returning to the description of FIG. 12, the tag DB 5*b* is a database in which a tag is registered. Owing to the tag registration unit 6*b* and a creation unit 7*d*, described later, a tag is registered in the tag DB 5*b*.

FIG. 14 is a diagram illustrating an example of the data structure of a tag DB. For example, the tag DB 5*b* illustrated in FIG. 14 includes an item 5*b*_1 "Difference ID", an item 5*b*_2 "Tag ID", an item 5*b*_3 "Addition/Modification", an item 5*b*_4 "Component", an item 5*b*_5 "Detail", and an item 5*b*_6 "Word".

In the item 5*b*_1 "Difference ID", a difference ID is registered. The example of FIG. 14 illustrates a case where the difference ID "20111220" of the difference module whose name is "Input Information Verification" is registered in the item 5*b*_1 "Difference ID".

In the item 5*b*_2 "Tag ID", a tag ID is registered that serves as an ID used for identifying a tag. The example of FIG. 14 illustrates a case where, in the item 5*b*_2 "Tag ID", the tag ID "20111220-1" of a tag indicated by the top record from among four records is registered. In addition, the example of FIG. 14 illustrates a case where, in the item 5*b*_2 "Tag ID", the tag ID "20111220-2" of a tag indicated by the second top record from among the four records is registered. In addition, the example of FIG. 14 illustrates a case where, in the item 5*b*_2 "Tag ID", the tag ID "20111220-3" of a tag indicated by the third top record from among the four records is registered. In addition, the example of FIG. 14 illustrates a case where, in the item 5*b*_2 "Tag ID", the tag ID "20111220-4" of a tag indicated by the bottom record from among the four records is registered.

In the item 5*b*_3 "Addition/Modification", information is registered that indicates whether being an added component or a modified component. The example of FIG. 14 illustrates a case where, in the item 5*b*_3 "Addition/Modification" of the top record from among the four records, "Addition" is registered that indicates that a component is an added component. In addition, the example of FIG. 14 illustrates a case where, in the item 5*b*_3 "Addition/Modification" of the second top record from among the four records, "Addition" is registered. In addition, the example of FIG. 14 illustrates a case where, in the item 5*b*_3 "Addition/Modification" of the third top record from among the four records, "Addition" is registered. In addition, the example of FIG. 14 illustrates a case where, in the item 5*b*_3 "Addition/Modification" of the bottom record from among the four records, "Modification" is registered that indicates that a component is a modified component.

In the item $5b\_4$ "Component", the type of a component and the ID of the component are registered. The example of FIG. 14 illustrates a case where, in the item $5b\_4$ "Component" of the top record from among the four records, the type "Branch" of the component and the ID "4" of the component are registered. In addition, the example of FIG. 14 illustrates a case where, in the item $5b\_4$ "Component" of the second top record from among the four records, the type "Conditional Flow" of the component and the ID "5" of the component are registered. In addition, the example of FIG. 14 illustrates a case where, in the item $5b\_4$ "Component" of the third top record from among the four records, the type "Conditional Flow" of the component and the ID "6" of the component are registered. In addition, the example of FIG. 14 illustrates a case where, in the item $5b\_4$ "Component" of the bottom record from among the four records, the type "Flow" of the component and the ID "2" of the component are registered.

In the item $5b\_5$ "Detail", a character string described in a component is registered. The example of FIG. 14 illustrates a case where, in the item $5b\_5$ "Detail" of the top record from among the four records, a character string "$1 Information Is Unauthorized?" described in the component is registered. In addition, the example of FIG. 14 illustrates a case where, in the item $5b\_5$ "Detail" of the second top record from among the four records, a character string ""$1 Information Is Unauthorized?"->"$1 Information Is Input"" described in the component is registered. In addition, the example of FIG. 14 illustrates a case where, in the item $5b\_5$ "Detail" of the third top record from among the four records, a character string ""$1 Information Is Unauthorized?"->"End"" described in the component is registered. In addition, the example of FIG. 14 illustrates a case where, in the item $5b\_5$ "Detail" of the bottom record from among the four records, a character string ""$1 Information Is Input"->"$1 Information Is Unauthorized?"" described in the component is registered.

In the item $5b\_6$ "Word", a word is registered. The example of FIG. 14 illustrates a case where, in the item $5b\_6$ "Word" of the top record from among the four records, words "Information" and "Unauthorized" are registered. In addition, the example of FIG. 14 illustrates a case where, in the item $5b\_6$ "Word" of the second top record from among the four records, words "Information", "Unauthorized", and "Input" are registered. In addition, the example of FIG. 14 illustrates a case where, in the item $5b\_6$ "Word" of the third top record from among the four records, the words "Information" and "Unauthorized" are registered. In addition, the example of FIG. 14 illustrates a case where, in the item $5b\_6$ "Word" of the bottom record from among the four records, the words "Unauthorized" and "Input" are registered.

Returning to the description of FIG. 12, the application example DB $5c$ is a database in which an application example is registered. In the application example DB $5c$, owing to an application example analysis unit $6e$ described later, an application example is registered.

FIG. 15 is a diagram illustrating an example of the data structure of an application example DB. For example, the application example DB $5c$ illustrated in FIG. 15 includes an item $5c\_1$ "Difference ID", an item $5c\_2$ "Application Example ID", an item $5c\_3$ "Business Flow Model before Difference Module Is Applied", and an item $5c\_4$ "Application Example".

In the item $5c\_1$ "Difference ID", a difference ID is registered. The example of FIG. 15 illustrates a case where, in the item $5c\_1$ "Difference ID" of the first record, the difference ID "20111220" of the difference module whose name is "Input Information Verification" is registered. In addition, the example of FIG. 15 illustrates a case where, in the item $5c\_1$ "Difference ID" of the second record, the difference ID "20090101" of the difference module whose name is "Confirmation of Input Value" is registered.

In the item $5c\_2$ "Application Example ID", an application example ID is registered. The example of FIG. 15 illustrates a case where, in the item $5c\_2$ "Application Example ID" of the first record, an application example ID "20111220#1" is registered that indicates an application example obtained as a result of applying the difference module indicated by the difference ID "20111220" for the "1st" time. In addition, the example of FIG. 15 illustrates a case where, in the item $5c\_2$ "Application Example ID" of the second record, an application example ID "20090101#1" is registered that indicates an application example obtained as a result of applying the difference module indicated by the difference ID "20090101" for the "1st" time.

In the item $5c\_3$ "Business Flow Model before Difference Module Is Applied", the XML-format data of a business flow model before a difference module is applied is registered. The example of FIG. 15 illustrates a case where, in the item $5c\_3$ "Business Flow Model before Difference Module Is Applied" of the first record, the XML-format data of a business flow model before the difference module indicated by the difference ID "20111220" is applied is registered. In addition, the example of FIG. 15 illustrates a case where, in the item $5c\_3$ "Business Flow Model before Difference Module Is Applied" of the second record, the XML-format data of a business flow model before the difference module indicated by the difference ID "20090101" is applied is registered.

In the item $5c\_4$ "Application Example", the XML-format data of an application example is registered, the application example serving as a business flow model to which a difference module has been applied. The example of FIG. 15 illustrates a case where, in the item $5c\_4$ "Application Example" of the first record, the XML-format data of a business flow model to which the difference module indicated by the difference ID "20111220" has been applied is registered. The example of FIG. 15 illustrates a case where, in the item $5c\_4$ "Application Example" of the second record, the XML-format data of a business flow model to which the difference module indicated by the difference ID "20090101" has been applied is registered.

Returning to the description of FIG. 12, the storage unit 5 is, for example, a semiconductor memory element such a flash memory or a storage device such as a hard disk or an optical disk. In addition, the storage unit 5 is not limited to the above-mentioned types of storage device, and may also be a random access memory (RAM) or a read only memory (ROM).

The controller 6 includes an internal memory used for storing therein a program specifying various kinds of processing procedures and control data, and executes various types of processing owing to these. As illustrated in FIG. 12, the controller 6 includes a reception unit $6a$, the tag registration unit $6b$, a search unit $6c$, a display controller $6d$, and an application example analysis unit $6e$.

The reception unit $6a$ receives various types of information. For example, the reception unit $6a$ receives a difference module transmitted from the first terminal 11 through the communication unit 4. In addition, the reception unit $6a$ receives a search condition transmitted from the second terminal 12 through the communication unit 4. In addition, the reception unit $6a$ receives such various kinds of data as illustrated in the example of FIG. 11, transmitted from the second terminal 12 through the communication unit 4.

The tag registration unit 6b registers a tag in the tag DB 5b. As one embodiment, when the reception unit 6a has received a difference module, the tag registration unit 6b creates a difference ID used for identifying the received difference module. For example, when such a difference module as illustrated in the example of FIG. 5 has been received, the tag registration unit 6b creates the difference ID "20111220".

Subsequently, the tag registration unit 6b extracts the name of the difference module, set in the "name" of the received difference module. For example, when such a difference module as illustrated in the example of FIG. 5 has been received, the tag registration unit 6b extracts the name "Input Information Verification" of the difference module, set in the "name".

In addition, the tag registration unit 6b registers, in the difference module DB 5a, the created difference ID, the extracted name of the difference module, and the XML-format data of the received difference module with associating the created difference ID, the extracted name of the difference module, and the XML-format data of the received difference module with one another. For example, in the difference module DB 5a illustrated in the example of FIG. 13, the tag registration unit 6b registers the difference ID "20111220", the name "Input Information Verification", and the XML-format data of the difference module whose name is "Input Information Verification" with associating the difference ID "20111220", the name "Input Information Verification", and the XML-format data of the difference module whose name is "Input Information Verification" with one another.

Subsequently, the tag registration unit 6b performs the following processing operation on the basis of the XML-format data of the difference module newly registered in the difference module DB 5a. In other words, the tag registration unit 6b determines, as additional components, the type and the ID of a component added to a business flow model by the newly registered difference module being applied, and a character string described in the added component. FIG. 16 is a diagram for explaining an example of processing executed by a tag registration unit according to the present embodiment. For example, on the basis of the XML-format data of the difference module illustrated in FIG. 5, the tag registration unit 6b determines, as additional components, the type "Branch" and the ID "4" of an added component, and a character string "$1 Information Is Unauthorized?" described in the added component, as illustrated in FIG. 16. In addition, as illustrated in FIG. 16, the tag registration unit 6b determines, as additional components, the type "Conditional Flow" and the ID "5" of an added component, and a character string ""$1 Information Is Unauthorized?"->"$1 Information Is Input"" described in the added component. In addition, as illustrated in FIG. 16, the tag registration unit 6b determines, as additional components, the type "Conditional Flow" and the ID "6" of an added component, and a character string ""$1 Information Is Unauthorized?"->"End"" described in the added component.

Subsequently, on the basis of the XML-format data of the newly registered difference module, the tag registration unit 6b performs the following processing operation. In other words, the tag registration unit 6b determines, as modification components, the type and the ID of a component in the business flow model, the component being modified by the newly registered difference module being applied, and a character string described in the modified component. For example, on the basis of the XML-format data of the difference module illustrated in FIG. 5, the tag registration unit 6b performs the following processing operation. In other words, as illustrated in FIG. 16, the tag registration unit 6b determines, as modification components, the type of "Flow" and the ID "2" of a modified component, and a character string ""$1 Information Is Input"->"$1 Information Is Unauthorized?"" described in the modified component.

In addition, the tag registration unit 6b extracts words from a character string described in the added component and a character string described in the modified component. For example, the tag registration unit 6b extracts words "Information" and "Unauthorized" from the character string "$1 Information Is Unauthorized?" described in the added component. In addition, the tag registration unit 6b extracts words "Information", "Unauthorized", and "Input" from the character string ""$1 Information Is Unauthorized?"->"$1 Information Is Input"" described in the added component. In addition, the tag registration unit 6b extracts words "Information" and "Unauthorized" from the character string ""$1 Information Is Unauthorized?"->"End"" described in the added component. In addition, the tag registration unit 6b extracts words "Information", "Unauthorized", and "Input" from the character string ""$1 Information Is Input"->"$1 Information Is Unauthorized?"" described in the modified component.

Subsequently, the tag registration unit 6b creates a tag ID with respect to each of an added component and a modified component. By adding a symbol "-" to the end of the difference ID of the newly registered difference module and adding a numerical value to the symbol "-", it may be possible for the tag registration unit 6b to create a tag ID. For example, the tag registration unit 6b creates a tag ID "20111220-1" with respect to the added component where the type thereof is "Branch" and the ID thereof is "4". In addition, the tag registration unit 6b creates a tag ID "20111220-2" with respect to the added component where the type thereof is "Conditional Flow" and the ID thereof is "5". The tag registration unit 6b creates a tag ID "20111220-3" with respect to the added component where the type thereof is "Conditional Flow" and the ID thereof is "6". In addition, the tag registration unit 6b creates a tag ID "20111220-4" with respect to the modified component where the type thereof is "Flow" and the ID thereof is "2".

After that, the tag registration unit 6b registers the created difference IDs in the tag DB 5b. In addition to this, the tag registration unit 6b registers, in the tag DB 5b, a created tag ID, information indicating whether a component is an added component or a modified component, the type and the ID of the component, a character string described in the component, and a word with associating the created tag ID, the information indicating whether a component is an added component or a modified component, the type and the ID of the component, the character string described in the component, and the word with one another. Accordingly, a tag is created that corresponds to the difference module indicated by the difference ID. For example, as illustrated in FIG. 14, the tag registration unit 6b registers the difference ID "20111220" in the item 5b_1 "Difference ID" in the tag DB 5b. In addition to this, the tag registration unit 6b registers the tag ID "20111220-1", the information "Addition" indicating the added component, and the type "Branch" and the ID "4" of the component in the item 5b_2 "Tag ID", the item 5b_3 "Addition/Modification", and the item 5b_4 "Component", respectively. Furthermore, the tag registration unit 6b registers the character string "$1 Information Is Unauthorized?" described in the component and the words "Information" and "Unauthorized", in the item 5b_4 "Detail" and the item 5b_5 "Word", respectively.

Returning to the description of FIG. 12, the search unit 6c searches for various types of information. As one embodiment, when the reception unit 6a has received a search condition, the search unit 6c acquires the ID of a component, registered in the item "Selection Component ID" of the search condition, and the XML-format data of a business flow model, registered in the item "Application Target Model". For example, when the search condition illustrated in the example of FIG. 8 has been received, the search unit 6c acquires the ID "1" of the component 18h, registered in the item "Selection Component ID" of the search condition, and the XML-format data of the business flow model 18a, registered in the item "Application Target Model".

Subsequently, the search unit 6c acquires pieces of the XML-format data of all the difference modules, registered in the item 5a_3 "XML Representation" in the difference module DB 5a. For example, when the registration content of the difference module DB 5a is such a registration content as illustrated in the example of FIG. 13, the search unit 6c performs the following processing operation. In other words, the search unit 6c acquires pieces of the XML-format data of the difference module whose name is "Transfer of Authority", the difference module whose name is "Confirmation of Input Value", and the difference module whose name is "Input Information Verification".

Subsequently, the search unit 6c selects one piece of data, which has not been selected, from among all pieces of the XML-format data acquired from the difference module DB 5a. For example, when having acquired pieces of the XML-format data of the individual difference modules whose names are "Transfer of Authority", "Confirmation of Input Value", and "Input Information Verification", the search unit 6c performs the following processing operation. In other words, the search unit 6c selects one piece of data, which has not been selected and whose name is "Transfer of Authority", "Confirmation of Input Value", or "Input Information Verification".

In addition, the search unit 6c judges whether or not a model satisfies the following condition, the model being a model serving a portion of a business flow model indicated by the XML-format data acquired from the search condition, and including a component indicated by the acquired ID of a component. In other words, the search unit 6c judges whether or not such a model satisfies an application condition included in a difference module the selected data indicates. Here, a case will be described where the selected data is the XML-format data of a difference module whose name is "Transfer of Authority", the ID of a component, acquired from a search condition, is "1", and a XML-format data acquired from the search condition is the data of the business flow model 18a. In this case, since a model does not satisfy the application condition included in the difference module whose name is "Transfer of Authority", the model being a model serving a portion of the business flow model 18a indicated by the acquired data and including the component 18h the acquired ID "1" indicates, the search unit 6c performs the following processing operation. In other words, the search unit 6c judges that the model does not satisfy the application condition included in the difference module whose name is "Transfer of Authority", the model being a model serving a portion of the business flow model 18a and including the component 18h.

In addition, a case will be described where the selected data is the XML-format data of a difference module whose name is "Confirmation of Input Value", the ID of a component, acquired from a search condition, is "1", and a XML-format data acquired from the search condition is the data of the business flow model 18a. In this case, since a model satisfies the application condition included in the difference module whose name is "Confirmation of Input Value", the model being a model serving a portion of the business flow model 18a indicated by the acquired data and including the component 18h the acquired ID "1" indicates, the search unit 6c performs the following processing operation. In other words, the search unit 6c judges that the model satisfies the application condition included in the difference module whose name is "Confirmation of Input Value", the model being a model serving a portion of the business flow model 18a and including the component 18h.

In addition, a case will be described where the selected data is the XML-format data of a difference module whose name is "Input Information Verification", the ID of a component, acquired from a search condition, is "1", and a XML-format data acquired from the search condition is the data of the business flow model 18a. In this case, since a model satisfies the application condition included in the difference module whose name is "Input Information Verification", the model being a model serving a portion of the business flow model 18a indicated by the acquired data and including the component 18h the acquired ID "1" indicates, the search unit 6c performs the following processing operation. In other words, the search unit 6c judges that the model satisfies the application condition included in the difference module whose name is "Input Information Verification", the model being a model serving a portion of the business flow model 18a and including the component 18h.

Next, the search unit 6c acquires, from the difference module DB 5a, the difference ID of a difference module including the application condition judged to be satisfied. For example, the search unit 6c acquires, from the difference module DB 5a, the difference ID "20090101" of the difference module of "Confirmation of Input Value", the difference module including the application condition judged to be satisfied. In addition, the search unit 6c acquires, from the difference module DB 5a, the difference ID "20111220" of the difference module of "Input Information Verification", the difference module including the application condition judged to be satisfied.

In addition, the search unit 6c judges whether or not, from among all pieces of the XML-format data acquired from the difference module DB 5a, a piece of data exists that has not been selected. When a piece of data exists that has not been selected, the search unit 6c performs the above-mentioned processing operation for selecting one piece of data, which has not been selected, and performs individual processing operations after the processing operation for selecting one piece of data, which has not been selected. Accordingly, it may be possible for the search unit 6c to perform the above-mentioned judgment with respect to all pieces of the XML-format data acquired from the difference module DB 5a.

Subsequently, the search unit 6c judges whether or not at least one difference ID has been acquired. When at least one difference ID has been acquired, the search unit 6c selects one difference ID, which has not been selected, from among all the acquired difference IDs. For example, when the difference ID "20090101" and the difference ID "20111220" have been acquired, one of the difference ID "20090101" and the difference ID "20111220", which has not been selected, is selected.

In addition, from among records in the tag DB 5b, the search unit 6c determines a record where the selected difference ID is registered in the item of "Difference ID". FIG. 17 is a diagram illustrating an example of the registration content of a tag DB. Here, a case will be described where the registration content of the tag DB 5b is such a registration content as illustrated in FIG. 17. In this case, when the selected difference ID is "20111220", the search unit 6c determines a record where the difference ID "20111220" is registered in the item 5*b*_1 "Difference ID". In addition, when the selected difference ID is "20090101", the search unit 6*c* determines a record where the difference ID "20090101" is registered in the item 5*b*_1 "Difference ID".

Subsequently, the search unit 6*c* acquires keywords used for search, registered in the item "Search Keyword" in the search condition. For example, when the search condition illustrated in the example of FIG. 8 has been received, the search unit 6*c* acquires keywords used for search, "Lending" and "Confirmation", registered in the item "Search Keyword".

In addition, from among the acquired keywords, the search unit 6*c* selects one keyword that has not been selected. For example, when having acquired the keywords "Lending" and "Confirmation", the search unit 6*c* selects the keyword "Lending" or the keyword "Confirmation", which has not been selected.

Subsequently, the search unit 6*c* calculates the number of words that match the selected keyword and are registered in the item "Word" in the determined record. For example, a case will be described where the selected keyword is "Lending" and the determined record is the record that is illustrated in FIG. 17 and includes the difference ID "20111220". In this case, since the word "Lending" is not registered in the item 5*b*_6 "Word" in the record including the difference ID "20111220", the search unit 6*c* performs the following processing operation. In other words, the search unit 6*c* calculates the number, "0", of words that match the selected keyword "Lending" and are registered in the item 5*b*_6 "Word" in the determined record.

In addition, a case will be described where the selected keyword is "Confirmation" and the determined record is the record that is illustrated in FIG. 17 and includes the difference ID "20111220". In this case, since the word "Confirmation" is not registered in the item 5*b*_6 "Word" in the record including the difference ID "20111220", the search unit 6*c* performs the following processing operation. In other words, the search unit 6*c* calculates the number, "0", of words that match the selected keyword "Confirmation" and are registered in the item 5*b*_6 "Word" in the determined record.

In addition, a case will be described where the selected keyword is "Lending" and the determined record is the record that is illustrated in FIG. 17 and includes the difference ID "20090101". In this case, since the word "Lending" is not registered in the item 5*b*_6 "Word" in the record including the difference ID "20090101", the search unit 6*c* performs the following processing operation. In other words, the search unit 6*c* calculates the number, "0", of words that match the selected keyword "Lending" and are registered in the item 5*b*_6 "Word" in the determined record.

In addition, a case will be described where the selected keyword is "Confirmation" and the determined record is the record that is illustrated in FIG. 17 and includes the difference ID "20090101". In this case, since one word "Confirmation" is registered in the item 5*b*_6 "Word" in the record including the difference ID "20090101", the search unit 6*c* performs the following processing operation. In other words, the search unit 6*c* calculates the number, "1", of words that match the selected keyword "Confirmation" and are registered in the item 5*b*_6 "Word" in the determined record.

In addition, the search unit 6*c* judges whether or not a keyword, which has not been selected, exists within the acquired keywords. When a keyword exists that has not been selected, the search unit 6*c* performs the above-mentioned processing operation for selecting one keyword that has not been selected, and performs individual processing operations after the processing operation for selecting one keyword that has not been selected. In addition, when no keyword exists that has not been selected, the search unit 6*c* judges whether or not a difference ID, which has not been selected, exists within the acquired difference IDs. When a difference ID exists that has not been selected, the search unit 6*c* performs the above-mentioned processing operation for selecting one difference ID that has not been selected, and performs individual processing operations after the processing operation for selecting one difference ID that has not been selected. Accordingly, it may be possible for the search unit 6*c* to calculate the number of words with respect to each of all the determined records for all the acquired keywords used for search.

When no difference ID exists that has not been selected, the search unit 6*c* calculates the sum of the calculated numbers of words with respect to each determined record. For example, a case will be described where the determined record is the record including the difference ID "20090101", illustrated in FIG. 17, the calculated number of the words "Lending" is "0", and the calculated number of the words "Confirmation" is "1". In this case, the search unit 6*c* calculates the sum "1" (0+1) of the numbers of words with respect to the record including the difference ID "20090101".

In addition, a case will be described where the determined record is the record including the difference ID "20111220", illustrated in FIG. 17, the calculated number of the words "Lending" is "0", and the calculated number of the words "Confirmation" is "0". In this case, the search unit 6*c* calculates the sum "0" (0+0) of the numbers of words with respect to the record including the difference ID "20111220".

In addition, the search unit 6*c* sets ranks in ascending order, starting from a record where the value of the sum of the calculated numbers of words is large. For example, a case will be described where the sum of the calculated numbers of words is "1" with respect to the record including the difference ID "20090101" and the sum of the calculated numbers of words is "0" with respect to the record including the difference ID "20111220". In this case, the search unit 6*c* sets a rank "1st place" in the record including the difference ID "20090101", and sets a rank "2nd place" in the record including the difference ID "20111220". In addition, a rank set in a record may also be the rank of a difference module a difference ID included in the record indicates.

Returning to the description of FIG. 12, the display controller 6*d* controls so that various types of information are displayed. For example, the display controller 6*d* transmits, to the second terminal 12 through the network 13, a rank set in a record, a difference ID registered in the item 5*b*_1 "Difference ID" in the record, and the XML-format data of a difference module the difference ID indicates with associating the rank set in the record, the difference ID registered in the item 5*b*_1 "Difference ID" in the record, and the XML-format data of the difference module the difference ID indicates with one another. In this way, the display controller 6*d* transmits, to the second terminal 12, the XML-format data of a difference module obtained as a result of search, a difference ID serving as the ID of such a difference module, and the rank of the difference module the difference ID indicates. For example, the display controller 6*d* transmits, to the second terminal 12, data where the rank "1st place" set in the record, the difference ID "20090101", and the XML-format data of the difference module the difference ID "20090101" indicates are associated with one another. In addition to this, the display controller 6*d* transmits, to the second terminal 12, data where the rank "2nd place" set in the record, the difference ID "20111220", and the XML-format data of the difference module the difference ID "20111220" indicates are associated with one another.

The application example analysis unit 6e updates the tag DB 5b on the basis of a difference ID, an application example ID, the XML-format data of a business flow model before a difference module is applied, and the XML-format data of an application example, which have been transmitted from the first terminal 11. The application example analysis unit 6e includes a determination unit 7a, an extraction unit 7b, a calculation unit 7c, and a creation unit 7d, as illustrated in the example of FIG. 12.

One embodiment of the determination unit 7a will be described. When the reception unit 6a has received a difference ID, an application example ID, the XML-format data of a business flow model before a difference module is applied, and the XML-format data of an application example, which have been transmitted from the first terminal 11, the determination unit 7a performs the following processing operation. In other words, in the application example DB 5c, the determination unit 7a registers the difference ID, the application example ID, the XML-format data of the business flow model before the difference module is applied, and the XML-format data of the application example.

Subsequently, the determination unit 7a acquires all the registration contents of the application example DB 5c. For example, when the registration contents of the application example DB 5c are such registration contents as illustrated in FIG. 15, the determination unit 7a acquires all the registration contents illustrated in FIG. 15.

In addition, on the basis of the acquired registration contents of the application example DB 5c, the determination unit 7a performs the following processing operation. In other words, with respect to each application example ID, the determination unit 7a determines, as additional components, the type and the ID of a component added to a business flow model by a difference module being applied, and a character string described in the added component. FIG. 18 is a diagram for explaining an example of processing executed by a determination unit according to the present embodiment. For example, on the basis of the registration contents of the application example DB 5c illustrated in FIG. 15, the determination unit 7a performs the following processing operation. In other words, as illustrated in FIG. 18, with respect to the application example ID "20111220#1", the determination unit 7a determines, as additional components, the type "Branch" and the ID "4" of an added component, and a character string "Lending Information Is Unauthorized?" described in the added component. In addition, as illustrated in FIG. 18, the determination unit 7a determines, as additional components, the type "Conditional Flow" and ID "5" of an added component, and a character string ""Lending Information Is Unauthorized?"->"Lending Information Is Input"" described in the added component. In addition, as illustrated in FIG. 18, the determination unit 7a determines, as additional components, the type "Conditional Flow" and ID "6" of an added component, and a character string ""Lending Information Is Unauthorized?"->"End"" described in the added component.

In addition, as illustrated in FIG. 18, with respect to the application example ID "20090101#1", the determination unit 7a determines, as additional components, the type "Activity" and the ID "4" of an added component, and a character string "Analysis Sample Is Put on Centrifugal Separator" described in the added component. In addition, as illustrated in FIG. 18, the determination unit 7a determines, as additional components, the type "Flow" and the ID "5" of an added component, and a character string ""Analysis Sample Is Put on Centrifugal Separator"->"Analysis Sample Is Confirmed"" described in the added component.

Subsequently, on the basis of the acquired registration contents of the application example DB 5c, the determination unit 7a performs the following processing operation. In other words, with respect to each application example ID, the determination unit 7a determines, as modification components, the type and the ID of a component in a business flow model, the component being modified by a difference module being applied, and a character string described in the modified component. For example, on the basis of the registration contents of the application example DB 5c illustrated in FIG. 15, the determination unit 7a performs the following processing operation. In other words, as illustrated in FIG. 18, with respect to the application example ID "20111220#1", the determination unit 7a determines, as modification components, the type "Flow" and the ID "2" of a modified component. In addition to this, the determination unit 7a also determines, as a modification component, a character string "Lending Information Is Input"->"Lending Information Is Unauthorized?" described in the modified component.

In addition, as illustrated in FIG. 18, with respect to the application example ID "20090101#1", the determination unit 7a determines, as modification components, the type "Flow" and ID "2" of a modified component. In addition to this, the determination unit 7a also determines, as a modification component, a character string ""Analysis Sample Is Input"->"Analysis Sample Is Put on Centrifugal Separator"" described in the modified component.

Returning to the description of FIG. 12, one embodiment of the extraction unit 7b will be described. With respect to each application example ID, the extraction unit 7b extracts words from a character string described in the added component and a character string described in the modified component. For example, with respect to the application example ID "20111220#1", the determination unit 7a extracts words "Lending Information" and "Unauthorized" from the character string "Lending Information Is Unauthorized?" described in the added component. In addition, the extraction unit 7b extracts words "Lending Information", "Unauthorized", and "Input" from the character string ""Lending Information Is Unauthorized?"->"Lending Information Is Input"" described in the added component. In addition, the extraction unit 7b extracts words "Lending Information" and "Unauthorized" from the character string ""Lending Information Is Unauthorized?"->"End"" described in the added component. In addition, the extraction unit 7b extracts words "Lending Information", "Unauthorized", and "Input" from the character string "Lending Information Is Input"->"Lending Information Is Unauthorized?" described in the modified component.

In addition, with respect to the application example ID "20090101#1", the extraction unit 7b extracts words "Analysis Sample" and "Centrifugal Separator" from the character string "Analysis Sample Is Put on Centrifugal Separator" described in the added component. In addition, the extraction unit 7b extracts words "Analysis Sample", "Centrifugal Separator", and "Confirmation" from the character string ""Analysis Sample Is Put on Centrifugal Separator"->"Analysis Sample Is Confirmed"" described in the added component. In addition, the extraction unit 7b extracts words "Input", "Analysis Sample", and "Centrifugal Separator" from the character string ""Analysis Sample Is Input"->"Analysis Sample Is Put on Centrifugal Separator"" described in the modified component.

One embodiment of the calculation unit 7c will be described. The calculation unit 7c creates a tag ID with respect to each of an added component and a modified component. By adding a symbol "-" to the end of an application example ID and adding a numerical value to the symbol "-", it may be possible for the calculation unit 7c to create a tag ID. For example, the calculation unit 7c creates a tag ID "20111220#1-1" with respect to the added component where the type thereof is "Branch" and the ID thereof is "4", illustrated in the example of FIG. 18. In addition, the calculation unit 7c creates a tag ID "20111220#1-2" with respect to the added component where the type thereof is "Conditional Flow" and the ID thereof is "5". In addition, the calculation unit 7c creates a tag ID "20111220#1-3" with respect to the added component where the type thereof is "Conditional Flow" and the ID thereof is "6". In addition, the calculation unit 7c creates a tag ID "20111220#1-4" with respect to the modified component where the type thereof is "Flow" and the ID thereof is "2".

In addition, the calculation unit 7c creates a tag ID "20090101#1-1" with respect to the added component where the type thereof is "Activity" and the ID thereof is "4", illustrated in the example of FIG. 18. In addition, the calculation unit 7c creates a tag ID "20090101#1-2" with respect to the added component where the type thereof is "Flow" and the ID thereof is "5". In addition, the calculation unit 7c creates a tag ID "20090101#1-3" with respect to the modified component where the type thereof is "Flow" and the ID thereof is "2".

Here, a correspondence relationship between a tag ID and an extracted word will be described. FIG. 19 is a diagram illustrating an example of a correspondence relationship between a tag ID and an extracted word. As illustrated in the example of FIG. 19, the tag IDs "20111220#1-1" to "20111220#1-4" correspond to the application example ID "20111220#1". In addition, the words "Lending Information" and "Unauthorized" correspond to the tag ID "20111220#1-1". The words "Lending Information", "Unauthorized", and "Input" correspond to the tag ID "20111220#1-2". In addition, the words "Lending Information" and "Unauthorized" correspond to the tag ID "20111220#1-3". In addition, the words "Lending Information", "Unauthorized", and "Input" correspond to the tag ID "20111220#1-4".

In addition, as illustrated in the example of FIG. 19, the tag IDs "20090101#1-1" to "20090101#1-3" correspond to the application example ID "20090101#1". In addition, the words "Analysis Sample" and "Centrifugal Separator" correspond to the tag ID "20090101#1-1". The words "Analysis Sample", "Centrifugal Separator", and "Confirmation" correspond to the tag ID "20090101#1-2". In addition, the words "Input", "Analysis Sample", and "Centrifugal Separator" correspond to the tag ID "20090101#1-3".

In addition, the calculation unit 7c determines the set of extracted words with respect to each application example ID. For example, with respect to the application example ID "20111220#1", the calculation unit 7c determines the set of the words "Lending Information", "Unauthorized", and "Input". In addition, with respect to the application example ID "20090101#1", the calculation unit 7c determines the set of the words "Analysis Sample", "Centrifugal Separator", "Input", and "Confirmation".

Subsequently, from among application example IDs included in the acquired registration contents of the application example DB 5c, the calculation unit 7c selects one application example ID that has not been selected. For example, when the registration contents of the application example DB 5c, illustrated in FIG. 15, have been acquired, the calculation unit 7c selects the application example ID "20111220#1" or the application example ID "20090101#1", which has not been selected.

Next, from among the set of words corresponding to the selected application example ID, the calculation unit 7c selects one word that has not been selected. For example, when the selected application example ID is "20111220#1", the calculation unit 7c selects one word that has not been selected, from among the set of the words "Lending Information", "Unauthorized", and "Input", which corresponds to the application example ID "20111220#1". In addition, when the selected application example ID is "20090101#1", the calculation unit 7c selects one word that has not been selected, from among the set of the words "Analysis Sample", "Centrifugal Separator", "Input", and "Confirmation", which corresponds to the application example ID "20090101#1".

Subsequently, in accordance with the following Expression 1, the calculation unit 7c calculates the weight w of a selected word with respect to each application example ID.

$$w = ((\text{the number of selected words in a selected application example ID})/(\text{the total number of words in the selected application example ID})) \times \log((\text{the total number of application example IDs included in the acquired registration contents of the application example } DB\ 5c)/(\text{the number of application example IDs corresponding to the selected words}))$$ Expression 1

Here, the base of log in Expression 1 is "2".

For example, when the selected application example ID is "20111220#1" and the selected word is "Lending Information", the calculation unit 7c calculates "0.4" ((4/10)×log(2/1)), as the weight w of the selected word "Lending Information". In addition, when the selected application example ID is "20111220#1" and the selected word is "Unauthorized", the calculation unit 7c calculates "0.4" ((4/10)×log(2/1)), as the weight w of the selected word "Unauthorized". In addition, when the selected application example ID is "20111220#1" and the selected word is "Input", the calculation unit 7c calculates "0" ((2/10)×log(2/2)), as the weight w of the selected word "Input".

In addition, when the selected application example ID is "20090101#1" and the selected word is "Analysis Sample", the calculation unit 7c calculates "0.375" ((3/8)×log(2/1)), as the weight w of the selected word "Analysis Sample". In addition, when the selected application example ID is "20090101#1" and the selected word is "Centrifugal Separator", the calculation unit 7c calculates "0.375" ((3/8)×log(2/1)), as the weight w of the selected word "Centrifugal Separator". In addition, when the selected application example ID is "20090101#1" and the selected word is "Input", the calculation unit 7c calculates "0.375" ((3/8)×log(2/1)), as the weight w of the selected word "Input". In addition, when the selected application example ID is "20090101#1" and the selected word is "Confirmation", the calculation unit 7c calculates "0.125" ((1/8)×log(2/1)), as the weight w of the selected word "Confirmation".

Here, the calculated weight w is a value increasing with an increase in the number of times a selected word occurs in an application example corresponding to a selected application example ID. In addition to this, the weight w is also a value increasing with a decrease in the number of times the selected word occurs in an application example other than the application example corresponding to the selected application example ID. In other words, the weight w may be a degree indicating that the number of times of the selected word occurs in the application example corresponding to the selected application example ID is high and indicating that the number of times the selected word occurs in an application example other than the application example corresponding to the selected application example ID is low.

Subsequently, the calculation unit 7c judges whether or not a word, which has not been selected, exists within the set of words corresponding to the selected application example ID. When a word exists that has not been selected, the calculation unit 7c performs the above-mentioned processing operation for selecting one word that has been selected, and performs individual processing operations after the processing operation for selecting one word that has not been selected. In addition, when no word exists that has not been selected, the calculation unit 7c judges whether or not an application example ID, which has not been selected, exists within the application examples ID included in the acquired registration contents of the application example DB 5c. When an application example ID exists that has not been selected, the calculation unit 7c performs the above-mentioned processing operation for selecting one application example ID that has been selected, and performs individual processing operations after the processing operation for selecting one application example ID that has not been selected. Accordingly, for a word included in the set of determined words, it may be possible for the calculation unit 7c to calculate the weight w with respect to each selected application example ID.

Returning to the description of FIG. 12, one embodiment of the creation unit 7d will be described. When the calculation unit 7c has judged that no application example ID exists that has not been selected, the creation unit 7d determines an application example ID and a word where the value of the weight w becomes a predetermined value, for example, 0.3, or more. Here, a word where the value of the weight w becomes the predetermined value or more may be a word where the number of times the word occurs in an application example is greater than or equal to a first predetermined value corresponding to the magnitude of the predetermined value and the number of times the word occurs in another application example is less than or equal to a second predetermined value corresponding to the magnitude of the predetermined value. For example, the creation unit 7d determines the application example ID "20111220#1" and the word "Lending Information" where the value of the weight w becomes 0.3 or more. In addition, the creation unit 7d determines the application example ID "20111220#1" and the word "Unauthorized" where the value of the weight w becomes 0.3 or more.

In addition, the creation unit 7d determines the application example ID "20090101#1" and the word "Analysis Sample" where the value of the weight w becomes 0.3 or more. In addition, the creation unit 7d determines the application example ID "20090101#1" and the word "Centrifugal Separator" where the value of the weight w becomes 0.3 or more.

Subsequently, a difference ID corresponding to a determined application example ID, a created tag ID, information indicating whether a component is an added component or a modified component, and the type and the ID of a component determined as an additional component or a modification component are added to the tag DB 5b by the creation unit 7d with being associated with one another. In addition to this, a character string described in the component determined as an additional component or a modification component and a determined word are also added to the tag DB 5b by the creation unit 7d with being associated with one another. Accordingly, the weight w of the word included in a tag newly added to the tag DB 5b is greater than or equal to the predetermined value, and the word becomes a word unique to an application example. Therefore, according to the creation unit 7d, it may be possible to create a tag where a search result is good.

FIG. 20 is a diagram illustrating an example of a tag DB to which a registration content is added by a creation unit according to the present embodiment. For example, the creation unit 7d adds new records whose number corresponds to additional contents to the tag DB 5b, and, as illustrated in FIG. 20, the creation unit 7d registers, in the added records, the difference ID "20111220" corresponding to the determined application example ID "20111220#1". In addition, the creation unit 7d registers, in an added record, the tag ID "20111220#1-1" with associating the tag ID "20111220#1-1" with the difference ID "20111220". In addition, the creation unit 7d registers, in the added record, information "Addition" indicating an added component with associating the information "Addition" with the tag ID "20111220#1-1". In addition, the creation unit 7d registers, in the added record, the type "Branch" and the ID "4" of a component determined as an additional component with associating the type "Branch" and the ID "4" with the tag ID "20111220#1-1". In addition, the creation unit 7d registers, in the added record, a character string "Lending Information Is Unauthorized?" described in the component determined as an additional component with associating the character string "Lending Information Is Unauthorized?" with the tag ID "20111220#1-1". In addition, the creation unit 7d registers, in the added record, determined words "Lending Information" and "Unauthorized" with associating the words "Lending Information" and "Unauthorized" with the tag ID "20111220#1-1".

In addition, as illustrated in FIG. 20, the creation unit 7d registers, in an added record, the tag ID "20111220#1-2" with associating the tag ID "20111220#1-2" with the difference ID "20111220". In addition, the creation unit 7d registers, in the added record, information "Addition" indicating an added component with associating the information "Addition" with the tag ID "20111220#1-2". In addition, the creation unit 7d registers, in the added record, the type "Conditional Flow" and the ID "5" of a component determined as an additional component with associating the "Conditional Flow" and the ID "5" with the tag ID "20111220#1-2". In addition, the creation unit 7d registers, in the added record, a character string ""Lending Information Is Unauthorized?"->"Lending Information Is Input"" described in the component determined as an additional component with associating the character string "Lending Information Is Unauthorized?"->"Lending Information Is Input"" with the tag ID "20111220#1-2". In addition, the creation unit 7d registers, in the added record, determined words "Lending Information" and "Unauthorized" with associating the words "Lending Information" and "Unauthorized" with the tag ID "20111220#1-2".

In addition, as illustrated in FIG. 20, the creation unit 7d registers, in an added record, the tag ID "20111220#1-3" with associating the tag ID "20111220#1-3" with the difference ID "20111220". In addition, the creation unit 7d registers, in the added record, information "Addition" indicating an added component with associating the information "Addition" with the tag ID "20111220#1-3". In addition, the creation unit 7d registers, in the added record, the type "Conditional Flow" and the ID "6" of a component determined as an additional component with associating the "Conditional Flow" and the ID "6" with the tag ID "20111220#1-3". In addition, the creation unit 7d registers, in the added record, a character string "Lending Information Is Unauthorized?"->"End"" described in the component determined as an additional component with associating the character string "Lending Information Is Unauthorized?"->"End"" with the tag ID "20111220#1-3". In addition, the creation unit 7d registers, in the added record, determined words "Lending Information" and "Unauthorized" with associating the words "Lending Information" and "Unauthorized" with the tag ID "20111220#1-3".

In addition, as illustrated in FIG. 20, the creation unit 7d registers, in an added record, the tag ID "20111220#1-4" with associating the tag ID "20111220#1-4" with the difference ID "20111220". In addition, the creation unit 7d registers, in the added record, information "Modification" indicating a modified component with associating the information "Modification" with the tag ID "20111220#1-4". In addition, the creation unit 7d registers, in the added record, the type "Flow" and the ID "2" of a component determined as a modified component with associating the "Flow" and the ID "2" with the tag ID "20111220#1-4". In addition, the creation unit 7d registers, in the added record, a character string "Lending Information Is Input"->"Lending Information Is Unauthorized?" described in the component determined as a modified component with associating the character string "Lending Information Is Input"->"Lending Information Is Unauthorized?" with the tag ID "20111220#1-4". In addition, the creation unit 7d registers, in the added record, determined words "Lending Information" and "Unauthorized" with associating the words "Lending Information" and "Unauthorized" with the tag ID "20111220#1-4".

In addition, as illustrated in FIG. 20, the creation unit 7d registers, in the added records, the difference ID "20090101" corresponding to the determined application example ID "20090101#1". In addition, the creation unit 7d registers, in an added record, the tag ID "20090101#1-1" with associating the tag ID "20090101#1-1" with the difference ID "20090101". In addition, the creation unit 7d registers, in the added record, information "Addition" indicating an added component with associating the information "Addition" with the tag ID "20090101#1-1". In addition, the creation unit 7d registers, in the added record, the type "Activity" and the ID "4" of a component determined as an additional component with associating the type "Activity" and the ID "4" with the tag ID "20090101#1-1". In addition, the creation unit 7d registers, in the added record, a character string "Analysis Sample Is Put on Centrifugal Separator" described in the component determined as an additional component with associating the character string "Analysis Sample Is Put on Centrifugal Separator" with the tag ID "20090101#1-1". In addition, the creation unit 7d registers, in the added record, determined words "Analysis Sample" and "Centrifugal Separator" with associating the words "Analysis Sample" and "Centrifugal Separator" with the tag ID "20090101#1-1".

In addition, as illustrated in FIG. 20, the creation unit 7d registers, in an added record, the tag ID "20090101#1-2" with associating the tag ID "20090101#1-2" with the difference ID "20090101". In addition, the creation unit 7d registers, in the added record, information "Addition" indicating an added component with associating the information "Addition" with the tag ID "20090101#1-2". In addition, the creation unit 7d registers, in the added record, the type "Flow" and the ID "5" of a component determined as an additional component with associating the type "Flow" and the ID "5" with the tag ID "20090101#1-2". In addition, the creation unit 7d registers, in the added record, a character string ""Analysis Sample Is Put on Centrifugal Separator"->"Analysis Sample Is Confirmed"" described in the component determined as an additional component with associating the character string ""Analysis Sample Is Put on Centrifugal Separator"->"Analysis Sample Is Confirmed"" with the tag ID "20090101#1-2". In addition, the creation unit 7d registers, in the added record, determined words "Analysis Sample" and "Centrifugal Separator" with associating the words "Analysis Sample" and "Centrifugal Separator" with the tag ID "20090101#1-2".

In addition, as illustrated in FIG. 20, the creation unit 7d registers, in an added record, the tag ID "20090101#1-3" with associating the tag ID "20090101#1-3" with the difference ID "20090101". In addition, the creation unit 7d registers, in the added record, information "Modification" indicating a modified component with associating the information "Modification" with the tag ID "20090101#1-3". In addition, the creation unit 7d registers, in the added record, the type "Flow" and the ID "2" of a component determined as a modified component with associating the type "Flow" and the ID "2" with the tag ID "20090101#1-3". In addition, the creation unit 7d registers, in the added record, a character string ""Analysis Sample Is Input"->"Analysis Sample Is Put on Centrifugal Separator"" described in the component determined as a modified component with associating the character string ""Analysis Sample Is Input"->"Analysis Sample Is Put on Centrifugal Separator"" with the tag ID "20090101#1-3". In addition, the creation unit 7d registers, in the added record, determined words "Analysis Sample" and "Centrifugal Separator" with associating the words "Analysis Sample" and "Centrifugal Separator" with the tag ID "20090101#1-3".

As illustrated in the example of FIG. 20, the weight w of a word included in a tag newly added to the tag DB 5b is greater than or equal to the predetermined value, and the word becomes a word unique to an application example. Therefore, according to the creation unit 7d, it may be possible to create a tag where a search result is good.

Figure 21:
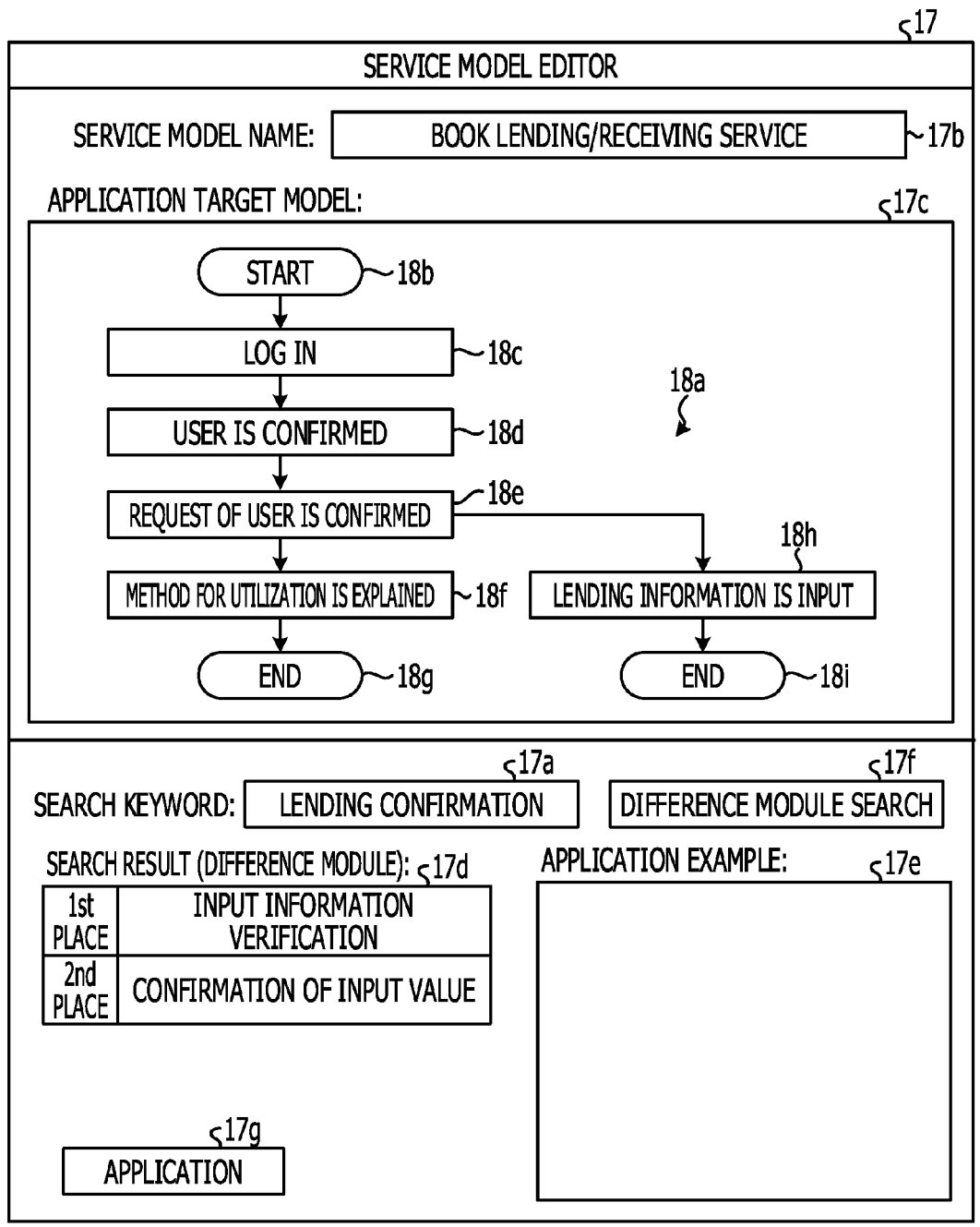
FIG. 21 is a diagram illustrating an example when a name of a difference module is displayed along with a rank.

Here, again, as described in the above-mentioned FIG. 7, when the user of the second terminal 12 has searched for a difference module and the search condition has been received that is illustrated in FIG. 8 and includes the keywords "Lending" and "Confirmation" used for search, the search unit 6c in the server 1 performs the following processing operation. In other words, the search unit 6c makes a rank, set in a record including the difference ID "20111220", higher than a rank set in a record including the difference ID "20090101". For example, the search unit 6c sets a rank "1st place" in the record including the difference ID "20111220", and sets a rank "2nd place" in the record including the difference ID "20090101". FIG. 21 is a diagram illustrating an example when the name of a difference module is displayed along with a rank. As a result of the above-mentioned processing due to the search unit 6c, as illustrated in the example of FIG. 21, in the display area 17d in the screen 17 displayed in the display unit 12b in the second terminal 12, the name "Input Information Verification" of the difference module is displayed with being associated with the rank "1st place". In addition, in the display area 17d, the name "Confirmation of Input Value" of the difference module is displayed with being associated with the rank "2nd place". In other words, a tag is created where a search result is good, and as a result of this, a rank associated with the name of a difference module also becomes an adequate rank according to a keyword used for search.

The controller 6 is an integrated circuit such as an application specific integrated circuit (ASIC). In addition, the controller 6 may also be a field programmable gate array (FPGA). In addition, the controller 6 may also be an electronic circuit such as a central processing unit (CPU). Furthermore, the controller 6 may also be a micro processing unit (MPU).

Figure 22:
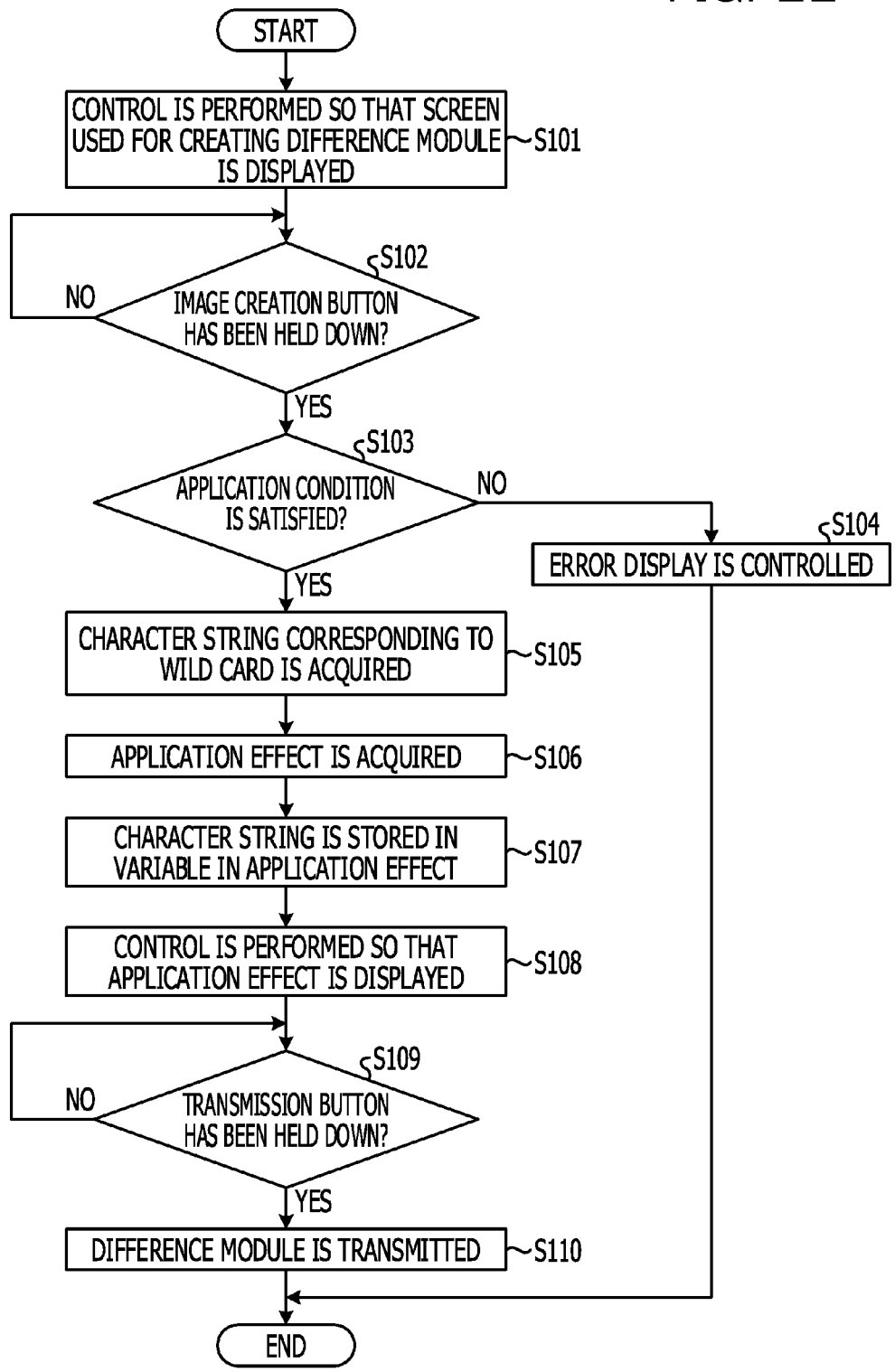
FIG. 22 is a flowchart illustrating a procedure of difference module creation processing according to an embodiment.

Next, the flow of processing will be described, the processing being executed by the first terminal 11 according to the present embodiment. FIG. 22 is a flowchart illustrating the procedure of difference module creation processing according to an embodiment. For example, when an instruction for executing the difference module creation processing has been input from the input unit 11a to the controller 11c, the difference module creation processing is executed.

As illustrated in FIG. 22, the controller 11c executes an installed program, and controls the display unit 11b so that a screen used for creating a difference module is displayed (S101). Here, as an example, a case will be cited and described where the controller 11c causes the display unit 11b to display the above-mentioned screen 14, as the screen used for creating a difference module.

After pieces of information have been registered in the individual items of the items 14a to 14e, the controller 11c judges whether or not the input unit 11a has been operated by the user and the image creation button 14g has been held down (S102). When the image creation button 14g is not held down (S102: negative), the controller 11c performs the judgment in S102 again. On the other hand, when the image creation button 14g has been held down (S102: affirmative), the controller 11c performs the following processing operation. In other words, the controller 11c judges whether or not a component registered in the item 14e satisfies an application condition registered in the item 14c (S103). When the component registered in the item 14e does not satisfy the application condition (S103: negative), the controller 11c controls the display of the display unit 11b so that an error display to the effect that reregistration to the item 14e is prompted is performed in the display area 14f (S104), and the controller 11c terminates the processing.

On the other hand, when the component registered in the item 14e satisfies the application condition registered in the item 14c (S103: affirmative), the controller 11c acquires a character string corresponding to a wild card described in a component registered in the item 14c, from a character string described in the component registered in the item 14e (S105). In addition, the controller 11c acquires an application effect registered in the item 14d (S106). Subsequently, the controller 11c stores the acquired character string in a variable described in a component in the acquired application effect (S107). After that, the controller 11c controls the display of the display unit 11b so that the application effect including the component in which the character string is stored in the variable is displayed in the display area 14f (S108).

In addition, the controller 11c judges whether or not the transmission button 14h has been held down (S109). When the transmission button 14h is not held down (S109: negative), the controller 11c performs the judgment in S109 again.

On the other hand, when the transmission button 14h has been held down (S109: affirmative), the controller 11c transmits, to the server 1 through the network 13, a difference module including the registration contents of the individual items of the items 14a to 14d (S110), and terminates the processing.

Figure 23:
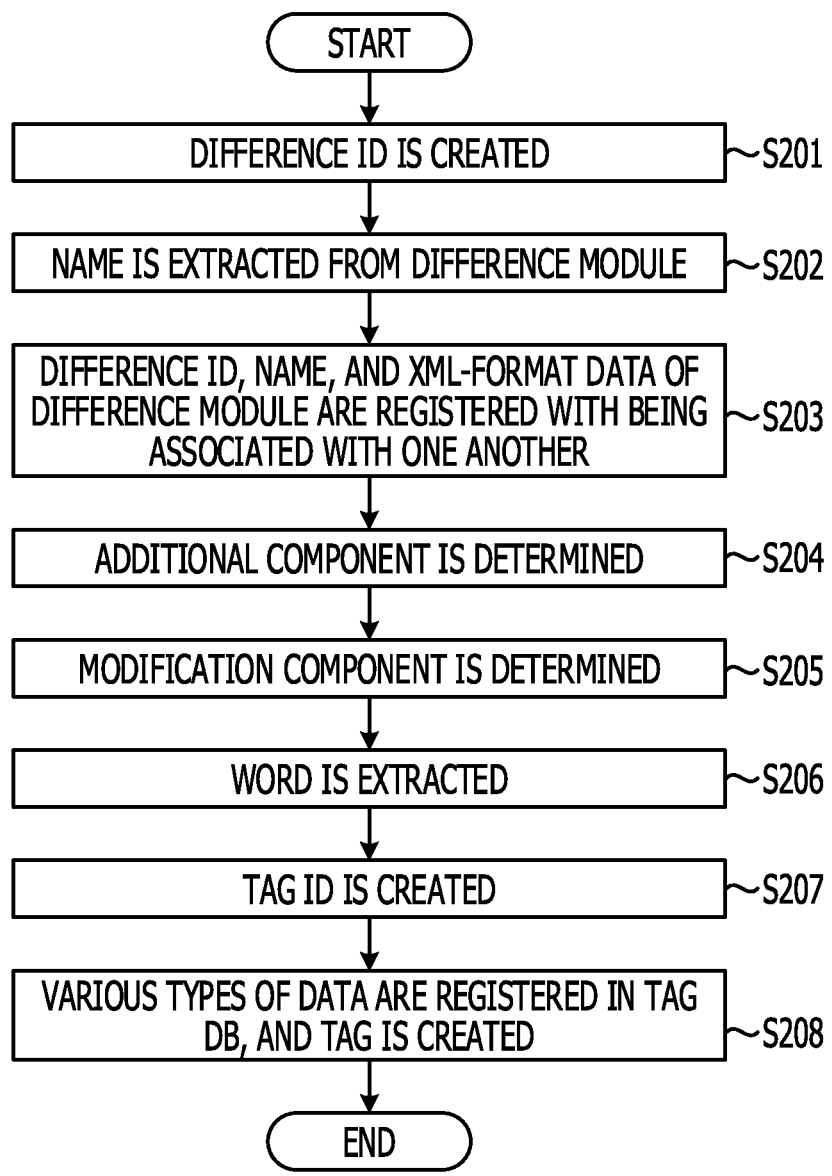
FIG. 23 is a flowchart illustrating a procedure of tag creation processing according to an embodiment.

Next, the flow of the tag creation processing the server 1 according to the present embodiment executes will be described. FIG. 23 is a flowchart illustrating the procedure of tag creation processing according to an embodiment. For example, when the reception unit 6a has received a difference module, the tag creation processing is executed.

As illustrated in FIG. 23, the tag registration unit 6b creates a difference ID used for identifying the received difference module (S201). Subsequently, the tag registration unit 6b extracts the name of the difference module, set in the "name" of the received difference module (S202).

In addition, the tag registration unit 6b registers, in the difference module DB 5a, the created difference ID, the extracted name of the difference module, and the XML-format data of the received difference module with associating the created difference ID, the extracted name of the difference module, and the XML-format data of the received difference module with one another (S203).

Next, the tag registration unit 6b performs the following processing operation on the basis of the XML-format data of the difference module newly registered in the difference module DB 5a. In other words, the tag registration unit 6b determines, as additional components, the type and the ID of a component and a character string described in the component, the component being added to a business flow model by the newly registered difference module being applied (S204).

Subsequently, the tag registration unit 6b performs the following processing operation on the basis of the XML-format data of the newly registered difference module. In other words, the tag registration unit 6b determines, as modification components, the type and the ID of a component and a character string described in the component, the component being modified by the newly registered difference module being applied (S205).

In addition, the tag registration unit 6b extracts words from a character string described in the added component and a character string described in the modified component (S206). Subsequently, the tag registration unit 6b creates a tag ID with respect to each of the added component and the modified component (S207).

After that, the tag registration unit 6b registers the created difference IDs in the tag DB 5b. In addition to this, the tag registration unit 6b registers, in the tag DB 5b, a created tag ID, information indicating whether being an added component or a modified component, the type and the ID of a component, a character string described in the component, and a word with associating the created tag ID, the information indicating whether being an added component or a modified component, the type and the ID of the component, the character string described in the component, and the word with one another (S208). Accordingly, a tag is created that corresponds to the difference module indicated by the difference ID. In addition, the tag registration unit 6b terminates the processing.

Figure 24:
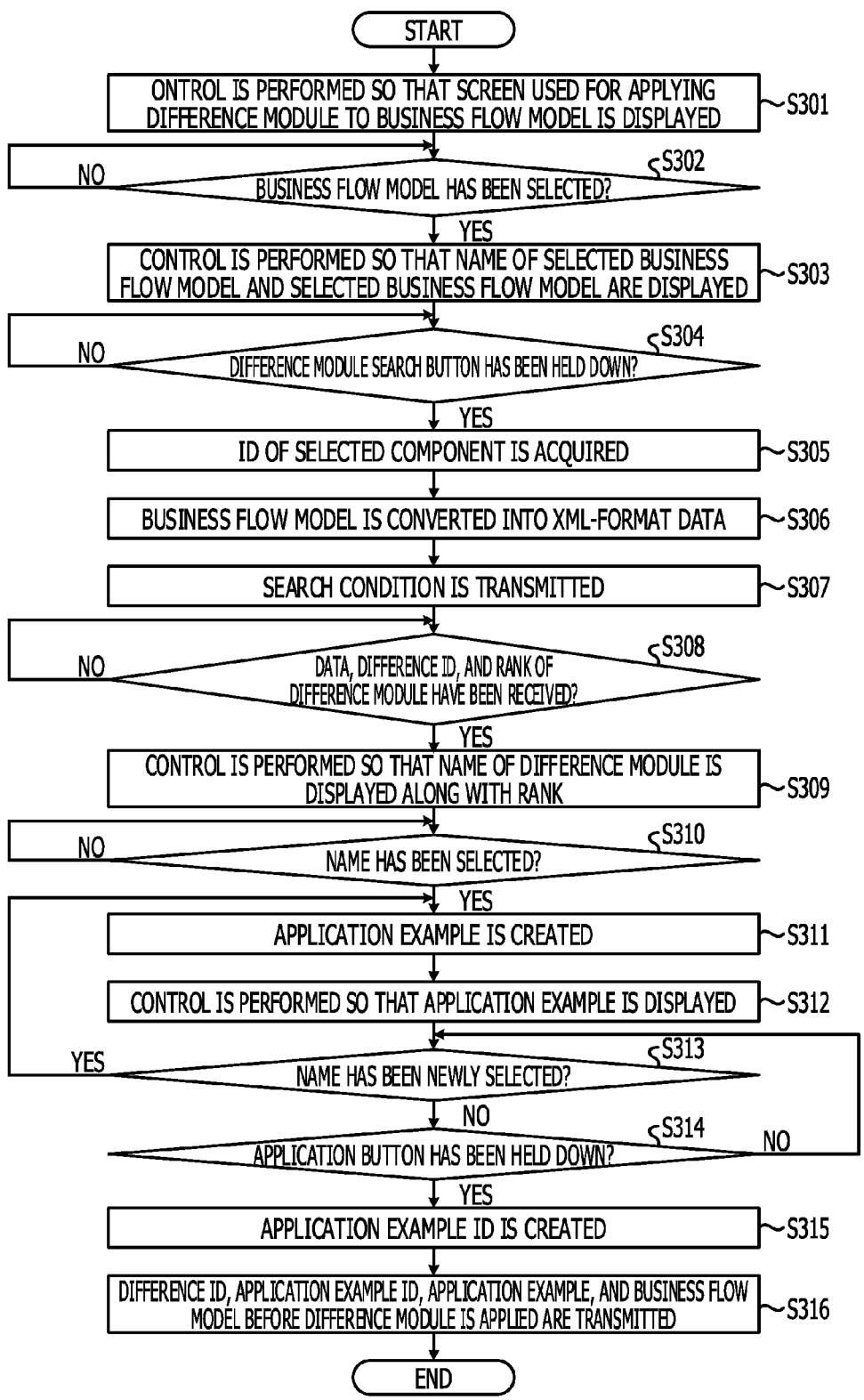
FIG. 24 is a flowchart illustrating a procedure of difference module application processing according to an embodiment.

Next, the flow of processing the second terminal 12 according to the present embodiment executes will be described. FIG. 24 is a flowchart illustrating the procedure of difference module application processing according to an embodiment. For example, when an instruction for executing the difference module application processing has been input from the input unit 12a to the controller 12c, the difference module application processing is executed.

As illustrated in FIG. 24, by executing an installed program, the controller 12c searches for a difference module, and controls the display unit 12b so as to display a screen used for applying, to a business flow model, the difference module obtained as a result of the search (S301). Here, as an example, a case will be cited and described where the controller 12c causes the display unit 12b to display the above-mentioned screen 17, as the screen used for applying, to the business flow model, the difference module obtained as a result of the search.

Next, the controller 12c judges whether or not the user has selected, through the input unit 12a, a business flow model to which the difference module is to be applied, from among business flow models stored in the storage unit (S302). When no business flow model has been selected (S302: negative), the controller 12c performs the judgment in S302 again. On the other hand, when a business flow model has been selected (S302: affirmative), the controller 12c performs the following processing operation. In other words, the controller 12c controls the display unit 12b so that the name of the selected business flow model is displayed in the display area 17b and the selected business flow model is displayed in the display area 17c (S303).

Subsequently, the controller 12c judges whether or not the difference module search button 17f has been held down (S304). When the difference module search button 17f is not held down (S304: negative), the controller 12c performs the judgment in S304 again. On the other hand, when the difference module search button 17f has been held down (S304: affirmative), the controller 12c acquires the ID of a component displayed and selected in the display area 17c (S305). Subsequently, the controller 12c converts the business flow model displayed in the display area 17c, into XML-format data (S306). In addition, the controller 12c sets, in one file, the XML-format data obtained as a result of the conversion, a keyword used for search, input to the item 17a, and the acquired ID, and transmits, as a search condition, the file to the server 1 through the network 13 (S307).

After that, the controller 12c judges whether or not the XML-format data of the difference module obtained as a result of the search, a difference ID serving as the ID of such a difference module, and the rank of the difference module indicated by the difference ID, transmitted from the server 1, have been received (S308). When the data, the difference ID, and the rank have not been received (S308: negative), the controller 12c performs the judgment in S308 again. On the other hand, when the data, the difference ID, and the rank have been received (S308: affirmative), the controller 12c performs the following processing operation. In other words, the controller 12c controls the display unit 12b so as to display the name of the received difference module in the display area 17d along with the rank (S309).

In addition, the controller 12c judges whether or not the name of a difference module displayed in the display area 17d has been selected by the user (S310). When the name of a difference module is not selected (S310: negative), the controller 12c performs the judgment in S310 again. On the other hand, when the name of a difference module has been selected (S310: affirmative), the controller 12c performs the following processing operation. In other words, the controller 12c applies the difference module whose name has been selected, to the business flow model that is displayed in the display area 17c and includes the selected component, and creates, as an application example, a business flow model to which the difference module has been applied (S311). In addition, the controller 12c controls the display unit 12b so that the created application example is displayed in the display area 17e (S312). Subsequently, the controller 12c judges whether or not the name of a difference module displayed in the display area 17d has been newly selected by the user (S313). When the name of a difference module has been newly selected (S313: affirmative), the controller 12c returns to S311.

On the other hand, when the name of a difference module is not newly selected (S313: negative), the controller 12c judges whether or not the application button 17g has been held down by the user through the input unit 12a (S314). When the application button 17g is not held down (S314: negative), the controller 12c returns to S313. On the other hand, when the application button 17g has been held down (S314: affirmative), the controller 12c performs the following processing operation. In other words, the controller 12c calculates the number N of times the selected difference module has been applied, adds the symbol "#" to the end of the difference ID of the applied difference module, furthermore adds the calculated number N of times, and creates an application example ID (S315).

After that, the controller 12c transmits, to the server 1, the difference ID of the applied difference module, the created application example ID, the XML-format data of the business flow model before the difference module is applied, and the XML-format data of the created application example (S316). In addition, the controller 12c terminates the processing.

Figure 25:
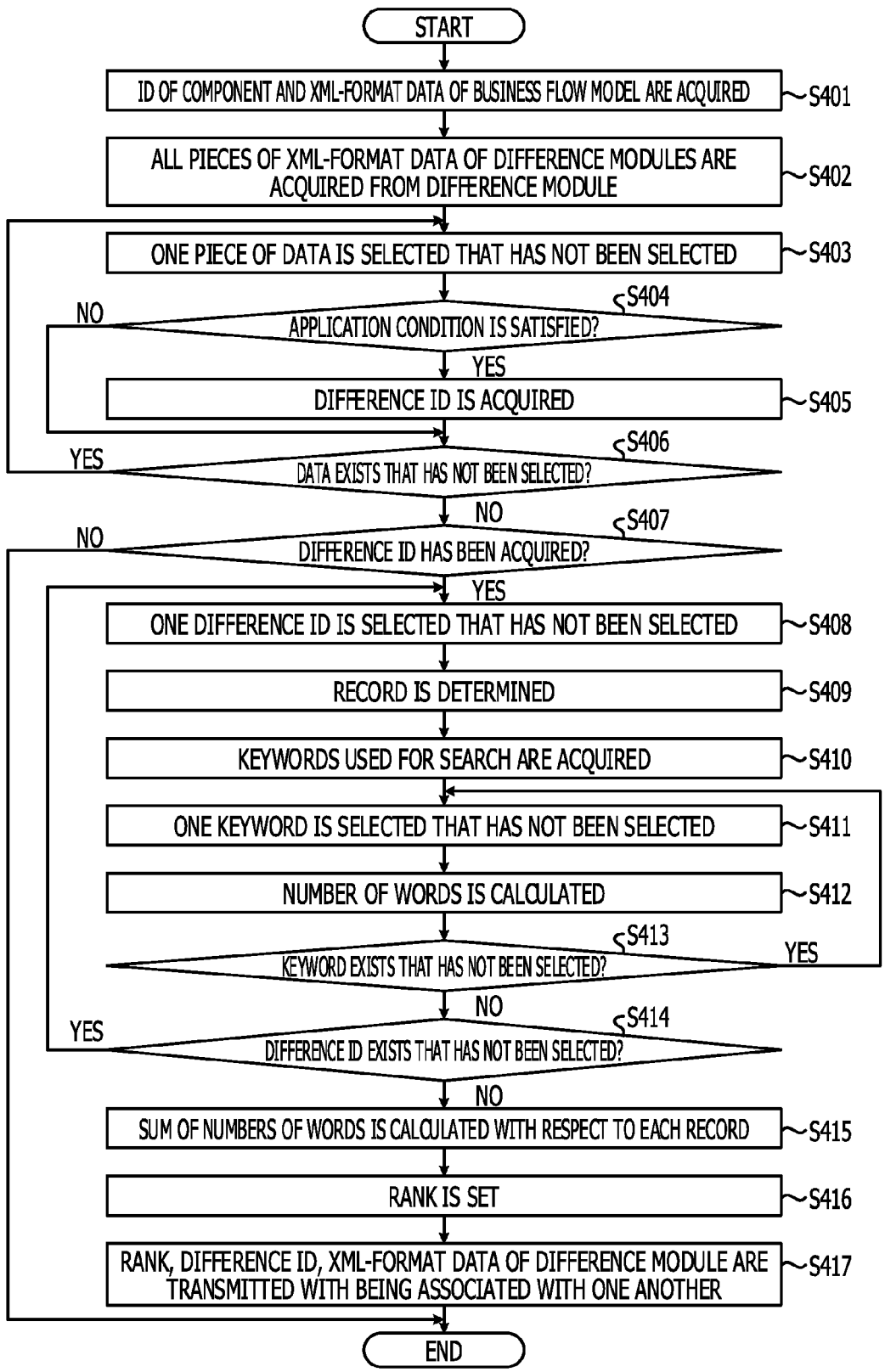
FIG. 25 is a flowchart illustrating a procedure of search processing according to an embodiment.

Next, the flow of search processing the server 1 according to the present embodiment executes will be described. FIG. 25 is a flowchart illustrating the procedure of search processing according to an embodiment. For example, when the reception unit 6a has received a search condition, the search processing is executed.

As illustrated in FIG. 25, the search unit 6c acquires the ID of a component, registered in the item "Selection Component ID" in the search condition, and the XML-format data of a business flow model, registered in the item "Application Target Model" (S401). Subsequently, the search unit 6c acquires all pieces of the XML-format data of difference modules, registered in the item 5a_3 "XML Representation" in the difference module DB 5a (S402).

Subsequently, the search unit 6c selects one piece of data, which has not been selected, from among all pieces of the XML-format data acquired from the difference module DB 5a (S403). In addition, the search unit 6c judges whether or not a model satisfies the following condition, the model being a model serving a portion of a business flow model indicated by the XML-format data acquired from the search condition, and including a component indicated by the acquired ID of a component. In other words, the search unit 6c judges whether or not such a model satisfies an application condition included in a difference module the selected data indicates (S404). When the model does not satisfy the application condition (S404: negative), the search unit 6c proceeds to S406. On the other hand, when the model satisfies the application condition (S404: affirmative), the search unit 6c acquires, from the difference module DB 5a, the difference ID of a difference module including the application condition judged to be satisfied (S405).

In addition, the search unit 6c judges whether or not, from among all pieces of the XML-format data acquired from the difference module DB 5a, a piece of data exists that has not been selected (S406). When a piece of data exists that has not been selected (S406: affirmative), the search unit 6c returns to S403. On the other hand, when no piece of data exists that has not been selected (S406: negative), the search unit 6c judges whether or not at least one difference ID has been acquired (S407). When no difference ID is acquired (S407: negative), the search unit 6c terminates the processing. When at least one difference ID has been acquired (S407: affirmative), the search unit 6c selects one difference ID, which has not been selected, from among all the acquired difference IDs (S408).

In addition, from among the records in the tag DB 5b, the search unit 6c determines a record where the selected difference ID is registered in the item "Difference ID" (S409). Subsequently, the search unit 6c acquires keywords used for search, registered in the item "Search Keyword" in the search condition (S410).

In addition, from among the acquired keywords, the search unit 6c selects one keyword that has not been selected (S411). Subsequently, the search unit 6c calculates the number of words that match the selected keyword and are registered in the item "Word" in the determined record (S412).

In addition, the search unit 6c judges whether or not a keyword, which has not been selected, exists within the acquired keywords (S413). When a keyword exists that has not been selected (S413: affirmative), the search unit 6c returns to S411. On the other hand, when no keyword exists that has not been selected (S413: negative), the search unit 6c judges whether or not a difference ID, which has not been selected, exists within the acquired difference IDs (S414). When a difference ID exists that has not been selected (S414: affirmative), the search unit 6c returns to S408.

On the other hand, when no difference ID exists that has not been selected (S414: negative), the search unit 6c calculates the sum of the calculated numbers of words with respect to each determined record (S415). In addition, the search unit 6c sets ranks in ascending order, starting from a record where the value of the sum of the calculated numbers of words is large (S416). In addition, the display controller 6d transmits, to the second terminal 12, data where a rank set in a record, a difference ID registered in the item 5b_1 "Difference ID" in the record, and the XML-format data of a difference module the difference ID indicates are associated with one another (S417). In addition, the display controller 6d terminates the processing.

Figure 26:
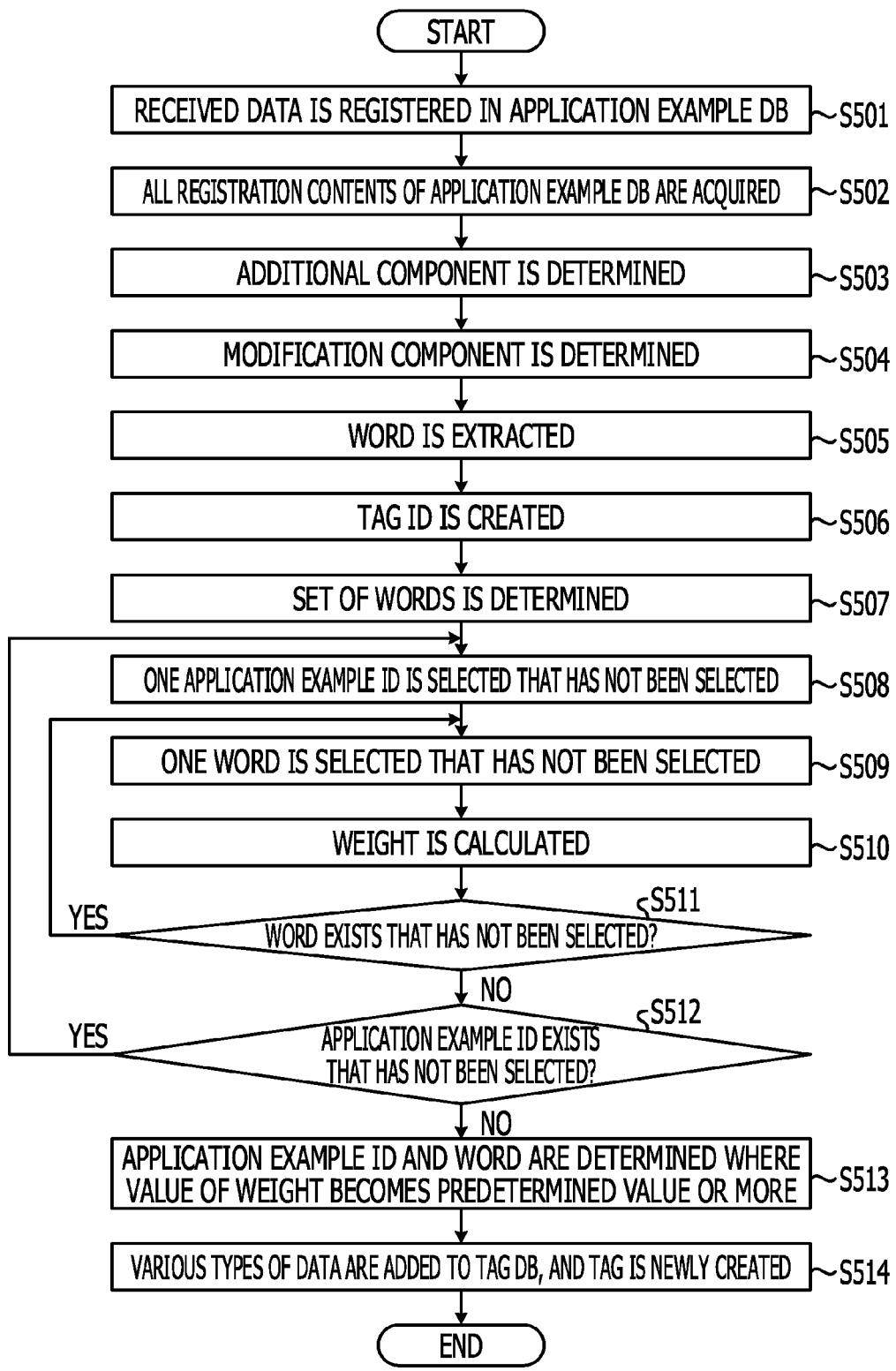
FIG. 26 is a flowchart illustrating a procedure of tag addition processing according to an embodiment.

Next, the flow of tag addition processing the server 1 according to the present embodiment executes will be described. FIG. 26 is a flowchart illustrating the procedure of tag addition processing according to an embodiment. For example, when the reception unit 6a has received a difference ID, an application example ID, the XML-format data of a business flow model before a difference module is applied, and the XML-format data of an application example, transmitted from the first terminal 11, the tag addition processing is executed.

As illustrated in FIG. 26, in the application example DB 5c, the determination unit 7a registers the difference ID, the application example ID, the XML-format data of the business flow model before the difference module is applied, and the XML-format data of the application example (S501).

Subsequently, the determination unit 7a acquires all the registration contents of the application example DB 5c (S502). In addition, on the basis of the acquired registration contents of the application example DB 5c, the determination unit 7a performs the following processing operation. In other words, with respect to each application example ID, the determination unit 7a determines, as additional components, the type and the ID of a component added to a business flow model by a difference module being applied and a character string described in the added component (S503).

Subsequently, on the basis of the acquired registration contents of the application example DB 5c, the determination unit 7a performs the following processing operation. In other words, with respect to each application example ID, the determination unit 7a determines, as modification components, the type and the ID of a component in a business flow model, the component being modified by a difference module being applied and a character string described in a modified component.

In addition, with respect to each application example ID, the extraction unit 7b extracts words from a character string described in the added component and a character string described in the modified component (S505). The calculation unit 7c creates a tag ID with respect to each of the added component and the modified component (S506). In addition, the calculation unit 7c determines the set of extracted words with respect to each application example ID (S507). Subsequently, from among application example IDs included in the acquired registration contents of the application example DB 5c, the calculation unit 7c selects one application example ID that has not been selected (S508).

Next, from among the set of words corresponding to the selected application example ID, the calculation unit 7c selects one word that has not been selected (S509). Subsequently, in accordance with the above-mentioned Expression 1, the calculation unit 7c calculates the weight w of a selected word with respect to each application example ID (S510).

Subsequently, the calculation unit 7c judges whether or not a word, which has not been selected, exists within the set of words corresponding to the selected application example ID (S511). When a word exists that has not been selected (S511: affirmative), the calculation unit 7c returns to S509. On the other hand, when no word exists that has not been selected (S511: negative), the calculation unit 7c judges whether or not an application example ID, which has not been selected, exists within the application examples ID included in the acquired registration contents of the application example DB 5c (S512). When an application example ID exists that has not been selected (S512: affirmative), the calculation unit 7c returns to S508.

On the other hand, when no application example ID exists that has not been selected (S512: negative), the creation unit 7d determines an application example ID and a word where the value of the weight w becomes a predetermined value, for example, 0.3, or more (S513).

In addition, the creation unit 7d adds, to the tag DB 5b, data where a difference ID corresponding to the determined application example ID, a created tag ID, information indicating whether a component is an added component or a modified component, and the type and the ID of a component determined as an additional component or a modification component are associated with one another. In addition to this, a character string described in the component determined as an additional component or a modification component and the determined word are also added to the tag DB 5b by the creation unit 7d with being associated with one another (S514), and the creation unit 7d terminates the processing.

As described above, on the basis of an application example when a difference module has been applied to a business flow model satisfying a condition, and a business flow model before the difference module is applied, the server 1 according to the present embodiment determines an additional component and a modification component. In addition, the server 1 extracts words from an additional component and a modification component. In addition, on the basis of a word described in a component in another application example and an extracted word, the server 1 calculates the weight w. In addition, on the basis of the weight w, the server 1 create a tag including a word where the number of times the word occurs in an application example is greater than or equal to the first predetermined value and the number of times the word occurs in another application example becomes the second predetermined value or less. In this way, the server 1 creates a tag including a word unique to an application example. Therefore, according to the server 1, it may be possible to create a tag where a search result is good.

In addition, the server 1 controls so that pieces of information relating to difference modules, for example, the names of the difference modules, are displayed in the second terminal 12 in order starting from a difference module where the number of words matching a keyword used for search is large. Therefore, according to the server 1, it may be possible to present, to the user of the second terminal 12, information relating to a difference module obtained as a result of search, along with a rank.

In addition, the server 1 transmits the difference module to the second terminal 12 so that an application example, to which the difference module obtained as a result of search has been applied, is displayed in the display area 17e in the screen 17. Therefore, according to the server 1, it may be possible to control so that an application example is displayed in the second terminal 12.

While, so far, embodiments relating to the disclosed system and the disclosed device have been described, the present technology may also be implemented in various different embodiments in addition to the above-mentioned embodiments. Therefore, hereinafter, the other embodiments included in the present technology will be described.

Figure 27:
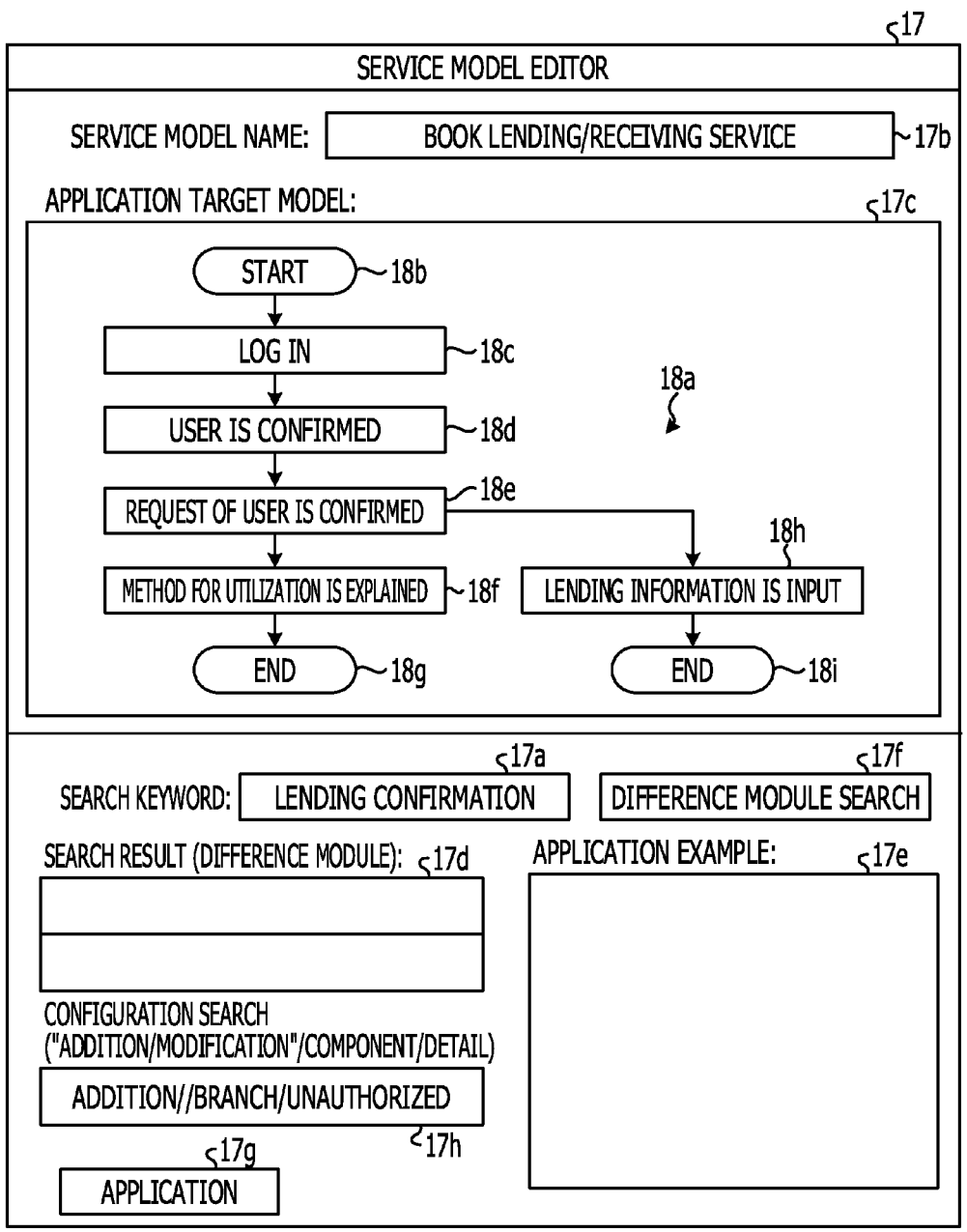
FIG. 27 is a diagram illustrating an example of a screen displayed in a second terminal according to an example of a modification to an embodiment.

Examples of a modification to the disclosed system and the disclosed device will be described. For example, it may be possible for the second terminal 12 to receive, from the user, information indicating whether being an added component or a modified component, the type of a component, and the combination of character strings described in the component, in addition to a keyword used for search. In addition, it may be possible for the second terminal 12 to cause the received combination to be included in a search condition and transmit the search condition to the server 1. FIG. 27 is a diagram illustrating an example of a screen displayed in a second terminal according to an example of a modification to an embodiment.

Compared with the screen in FIG. 7, the screen illustrated in FIG. 27 is different in that the screen includes an item 17h. In the item 17h through the input unit 12a, the user inputs information indicating whether being an added component or a modified component, the type of a component, and a character string described in the component. The example of FIG. 27 illustrates a case where the combination of "Addition" serving as information indicating being an added component, the type "Branch" of a component, and a character string "Unauthorized" described in the component has been input in the item 17h. When the difference module search button 17f has been held down, the controller 12c also causes the registration content of the item 17h to be included in a search condition in addition to XML-format data, a keyword used for search, and an ID, and transmits the search condition to the server 1.

When having received such a search condition, the search unit 6c in the server 1 performs the following processing operation after having performed the above-mentioned processing operation for calculating the sum of the numbers of words with respect to each determined record, namely, the processing operation in S415. In other words, the search unit 6c defines all acquired difference IDs as not having been selected. Subsequently, from among the acquired difference IDs, the search unit 6c selects one difference ID that has not been selected. For example, when having acquired the difference ID "20090101" and the difference ID "20111220", the search unit 6c selects one of the difference ID "20090101" and the difference ID "20111220", which has not been selected.

In addition, from among records in the tag DB 5b, the search unit 6c determines a record where the selected difference ID is registered in the item "Difference ID". Here, a case will be described where the registration contents of the tag DB 5b are such registration contents as illustrated in FIG. 17. In this case, when the selected difference ID is "20111220", the search unit 6c determines a record where the difference ID "20111220" is registered in the item 5b_1 "Difference ID". In addition, when the selected difference ID is "20090101", the search unit 6c determines a record where the difference ID "20090101" is registered in the item 5b_1 "Difference ID".

Subsequently, the search unit 6c acquires the registration content of the item 17h, included in the search condition. For example, when the registration content of the item 17h, illustrated in FIG. 27, is included in the search condition, the search unit 6c acquires the combination of "Addition", "Branch", and "Unauthorized".

In addition, from among acquired combinations, the search unit 6c selects one combination that has not been selected. For example, when having acquired the combination of "Addition", "Branch", and "Unauthorized", the search unit 6c selects the combination of "Addition", "Branch", and "Unauthorized".

Subsequently, the search unit 6c calculates the number of the combinations of registration contents, the combinations of registration contents matching the selected combination and being registered in the individual items "Addition/Modification", "Component", and "Detail" in the determined record. For example, a case will be described where the selected combination is the combination of "Addition", "Branch", and "Unauthorized" and the determined record is the record that is illustrated in FIG. 17 and includes the difference ID "20111220". In this case, from among records including the difference ID "20111220", the registration contents of the individual items "Addition/Modification", "Component", and "Detail" in a record including the tag ID "20111220-1" match the selected combination. Therefore, the search unit 6c calculates the number, "1", of the combinations of registration contents that match the selected combination and are registered in the individual items "Addition/Modification", "Component", and "Detail" in the determined record.

In addition, a case will be described where the selected combination is the combination of "Addition", "Branch", and "Unauthorized" and the determined record is the record that is illustrated in FIG. 17 and includes the difference ID "20090101". In this case, from among records including the difference ID "20090101", the combination of the registration contents registered in the individual items "Addition/Modification", "Component", and "Detail" in any one of the records do not match the selected combination. Therefore, the search unit 6c calculates the number, "0", of the combinations of registration contents that match the selected combination and are registered in the individual items "Addition/Modification", "Component", and "Detail" in the determined record.

In addition, the search unit 6c judges whether or not a combination, which has not been selected, exists within the acquired combinations. When a combination exists that has not been selected, the search unit 6c performs the above-mentioned processing operation for selecting one combination that has not been selected, and performs individual processing operations after the processing operation for selecting one combination that has not been selected. In addition, when no combination exists that has not been selected, the search unit 6c judges whether or not a difference ID, which has not been selected, exists within the acquired difference IDs. When a difference ID exists that has not been selected, the search unit 6c performs the above-mentioned processing operation for selecting one difference ID that has not been selected, and performs individual processing operations after the processing operation for selecting one difference ID that has not been selected. Accordingly, it may be possible for the search unit 6c to calculate the number of combinations with respect to each of all the determined records for all the acquired combinations.

When no difference ID exists that has not been selected, the search unit 6c calculates the sum of the calculated numbers of words and the calculated numbers of combinations with respect to each determined record. For example, a case will be described where the determined records are the records including the difference ID "20090101", illustrated in FIG. 17, the calculated number of the words "Lending" is "0", the calculated number of the words "Verification" is "0", and the calculated numbers of combinations is "0". In this case, the search unit 6c calculates the sum "0" (0+0+0) with respect to the records including the difference ID "20090101".

For example, a case will be described where the determined records are the records including the difference ID "20111220", illustrated in FIG. 17, the calculated number of the words "Lending" is "0", the calculated number of the words "Verification" is "0", and the calculated numbers of combinations is "1". In this case, the search unit 6c calculates the sum "0" (0+0+1) with respect to the records including the difference ID "20111220".

In addition, the search unit 6c sets ranks in ascending order, starting from a record where the value of the calculated sum is large. For example, a case will be described where the sum of the calculated sum is "0" with respect to the record including the difference ID "20090101" and the calculated sum is "1" with respect to the record including the difference ID "20111220". In this case, the search unit 6c sets a rank "1st place" in the record including the difference ID "20111220", and sets a rank "2nd place" in the record including the difference ID "20090101".

Figure 28:
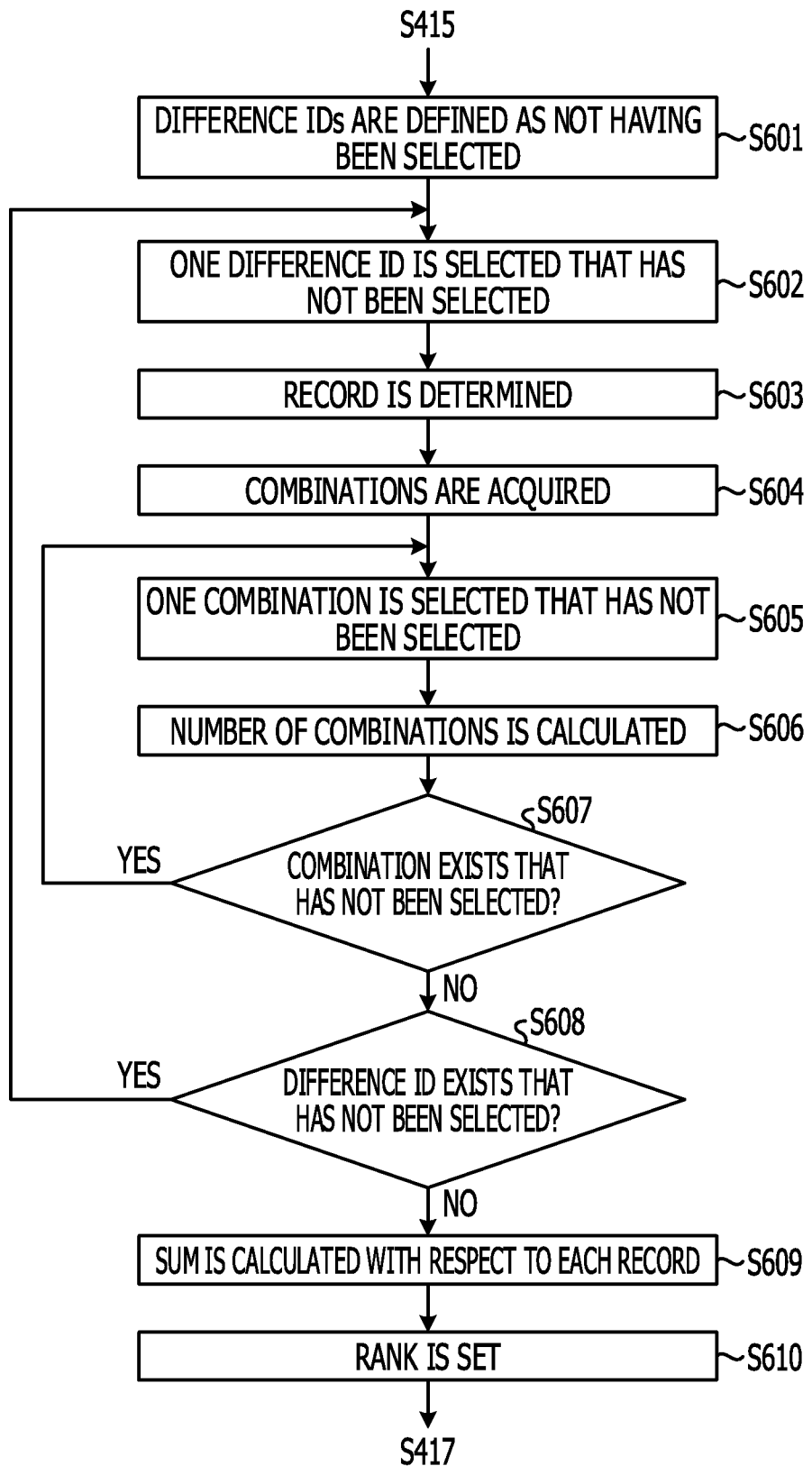
FIG. 28 is a flowchart illustrating a procedure of search processing according to an example of a modification to an embodiment.

Next, the flow of search processing the server 1 according to an example of a modification to an embodiment executes will be described. FIG. 28 is a flowchart illustrating the procedure of search processing according to an example of a modification to an embodiment. Compared with the search processing illustrated in FIG. 25, the search processing according to an example of a modification to an embodiment is different from the search processing illustrated in FIG. 25 in that S601 to S609 are executed subsequent to S415, and the search processing according to an example of a modification to an embodiment is different from the search processing illustrated in FIG. 25 in that S610 is executed in place of S416.

As illustrated in FIG. 28, after the processing operation in S415, the search unit 6c performs the following processing operations. In other words, the search unit 6c defines all acquired difference IDs as not having been selected (S601). Subsequently, from among the acquired difference IDs, the search unit 6c selects one difference ID that has not been selected (S602).

In addition, from among records in the tag DB 5b, the search unit 6c determines a record where the selected difference ID is registered in the item "Difference ID" (S603). Subsequently, the search unit 6c acquires the registration content of the item 17h, included in the search condition (S604).

In addition, from among acquired combinations, the search unit 6c selects one combination that has not been selected (S605). Subsequently, the search unit 6c calculates the number of the combinations of registration contents, the combinations of registration contents matching the selected combination and being registered in the individual items "Addition/Modification", "Component", and "Detail" in the determined record (S606).

In addition, the search unit 6c judges whether or not a combination, which has not been selected, exists within the acquired combinations (S607). When a combination exists that has not been selected (S607: affirmative), the search unit 6c returns to S605. On the other hand, when no combination exists that has not been selected (S607: negative), the search unit 6c judges whether or not a difference ID, which has not been selected, exists within the acquired difference IDs (S608). When a difference ID exists that has not been selected (S608: affirmative), the search unit 6c returns to S602.

When no difference ID exists that has not been selected (S608: negative), the search unit 6c calculates the sum of the calculated numbers of words and the calculated numbers of combinations with respect to each determined record (S609). In addition, the search unit 6c sets ranks in ascending order, starting from a record where the value of the calculated sum is large (S610), and proceeds to S417.

As described above, it may be possible for the server 1 according to an example of a modification to an embodiment to search for a difference module in accordance with the information indicating whether being an added component or a modified component, the type of a component, and the combination of character strings described in the component, in addition to a keyword used for search. Accordingly, according to the server 1 according to an example of a modification to an embodiment, it may be possible to search for a difference module with more detailed conditions.

In addition, from among the individual processing operations described in the embodiments, all or part of the processing operations described as being automatically executed may also be manually performed. In addition, from among the individual processing operations described in the embodiments, all or part of the processing operations described as being manually executed may also be automatically performed using an existing method.

In addition, in accordance with various kinds of loads or various statuses of use, the processing operations in the individual steps in each processing described in the embodiments may also be arbitrarily subdivided or collected. In addition, a step may also be omitted.

In addition, in accordance with various kinds of loads or various statuses of use, the order of the processing operations in the individual steps in each processing described in the embodiments may also be changed.

In addition, each illustrated configuration component in each device is functional and conceptual, and may not be physically configured in such a way as illustrated in the drawings. In other words, a specific state of the distribution or integration of the individual devices is not limited to one of examples illustrated in the drawings, and all or part of the individual devices may also be functionally or physically distributed or integrated in arbitrary units according to various kinds of loads or various statuses of use.

[Creation Program]

Figure 29:
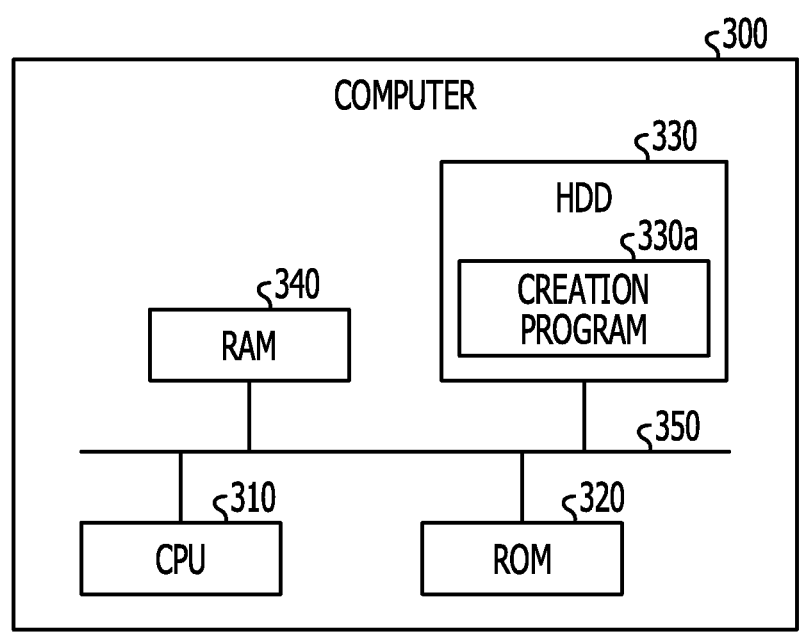
FIG. 29 is a diagram illustrating a computer executing a creation program.
Figure 30:
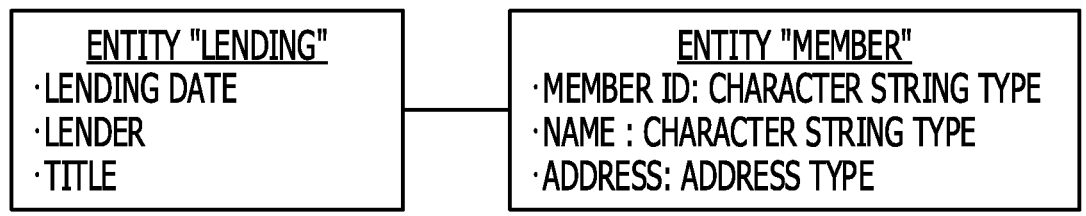
FIG. 30 is a diagram for explaining an example of a technique for creating a business application of the related art.
Figure 31:
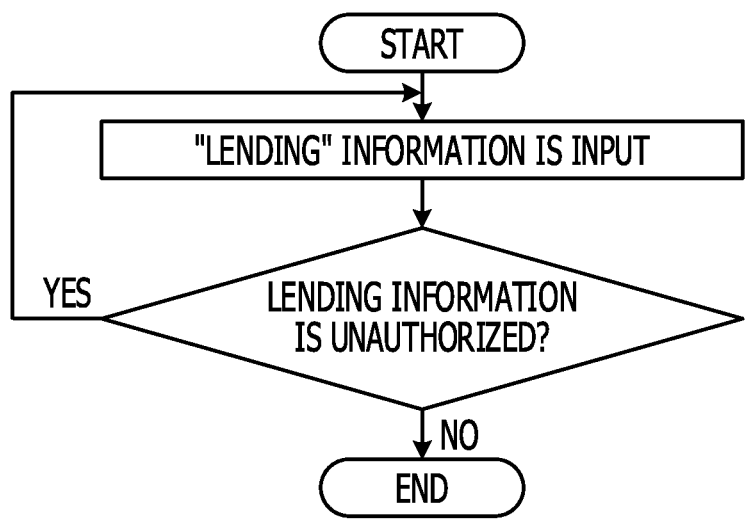
FIG. 31 is a diagram for explaining an example of a technique for creating a business application of the related art.
Figure 34:
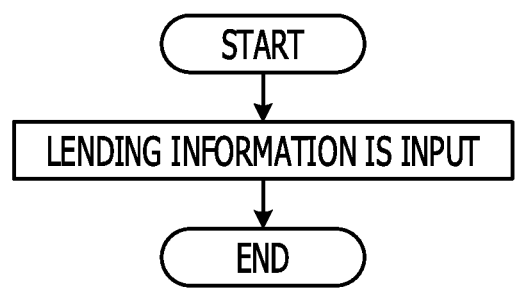
FIG. 34 is a diagram illustrating an example of a business flow model.
Figure 35:
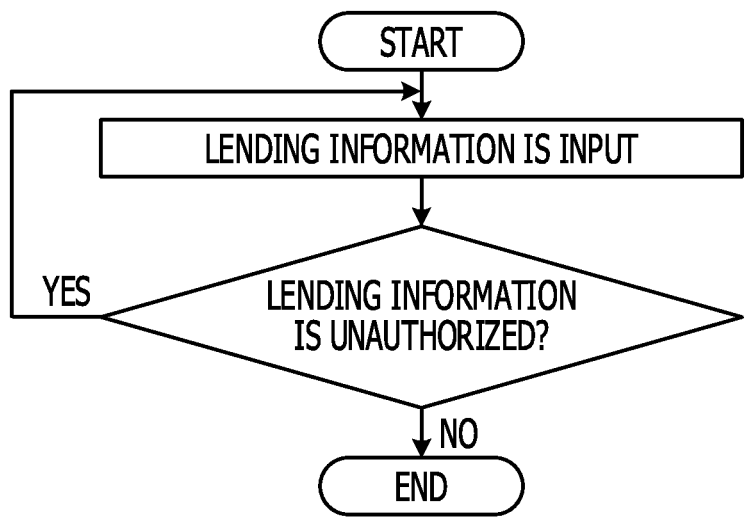
FIG. 35 is a diagram illustrating an example of a business flow model after a difference module has been applied.

In addition, various types of processing performed in the server 1 described in the above-mentioned embodiments and examples of a modification to an embodiment may also be realized by executing a preliminarily prepared creation program in a computer system such as a personal computer or a workstation. Therefore, hereinafter, using FIG. 29, an example of a computer will be described that executes a creation program having the same functions as the server 1 described in the above-mentioned embodiments and examples of a modification to an embodiment. FIG. 29 is a diagram illustrating a computer executing a creation program.

As illustrated in FIG. 29, a computer 300 includes a CPU 310, a ROM 320, a hard disk drive (HDD) 330, and a RAM 340. The CPU 310, the ROM 320, the HDD 330, and the RAM 340 are connected to one another through a bus 350.

A basic program such as an OS is stored in the ROM 320. In addition, in the HDD 330, a creation program 330a is preliminarily stored that has the same functions as the reception unit 6a, the tag registration unit 6b, the search unit 6c, the display controller 6d, and the application example analysis unit 6e, illustrated in the above-mentioned embodiments or examples of a modification to an embodiment. In addition, the creation program 330a may also be arbitrarily divided. In addition, in the HDD 330, a difference module DB, a tag DB, and an application example DB are provided. These difference modules DB, tag DB, and application example DB correspond to the difference module DB 5a, the tag DB 5b, and the application example DB 5c, described above.

In addition, the CPU 310 reads and executes the creation program 330a from the HDD 330.

In addition, the CPU 310 reads and stores the difference module DB, the tag DB, and the application example DB in the RAM 340. Furthermore, the CPU 310 executes the creation program 330a using the difference module DB, the tag DB, and the application example DB, stored in the RAM 340. In addition, all individual pieces of data stored in the RAM 340 may not be continuously stored in the RAM 340. Data only used for processing may be stored in the RAM 340.

In addition, the above-mentioned creation program 330a may not be stored in the HDD 330 from the beginning.

For example, the creation program 330a is caused to be stored in "portable physical media" such as a flexible disk (FD), a CD-ROM, a DVD disk, a magnet-optical disk, and an IC card, which are to be inserted into the computer 300. In addition, the computer 300 may also read and execute the creation program 330a from these.

Furthermore, the creation program 330a is caused to be stored in "other computers (or servers)" and the like, connected to the computer 300 through a public line, Internet, a LAN, a WAN, or the like. In addition, the computer 300 may also read and execute the creation program 330a from these.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A creation device comprising:
  a memory; and
  a processor coupled to the memory and configured to:
    determine an additional component serving as a component added to a second model owing to application of a module, and a modification component serving as a modified component in a third model, on the basis of the second model and the third model, wherein a condition, in at least a portion of which a wild card is described, and a first model are described in the module, the first model serving as a model when the module is applied to a model satisfying the condition and serving as a model including a variable in which a character string in a model satisfying the condition is stored, the character string corresponding to the wild card, and the third model is a model when the module is applied to the second model satisfying the condition and where a character string in the second model, which corresponds to the wild card, is stored in a variable,
    extract a word from the additional component and the modification component,
    on the basis of a word occurring in a fourth model to which a module, different from the module in which the condition and the first model are described, is applied, and the extracted word, calculate a degree indicating that the number of times the word occurs in the third model is high and indicating that the number of times the word occurs in the fourth model is low, and
    create, on the basis of the degree, a tag corresponding to the module in which the condition and the first model are described, the tag including a word where the number of times the word occurs in the third model is greater than or equal to a first predetermined value and the number of times the word occurs in the fourth model is less than or equal to a second predetermined value.

2. The creation device according to claim 1, wherein the processor is configured to:
  receive a model to be searched for and a word to be searched for,
  calculate the number of words matching the word to be searched for, from among words included in the tag corresponding to the module in which the condition is described, when the model to be searched for satisfies the condition, and
  control so that, in order starting from a module where the calculated number of words is high, information where information relating to the module is arranged is displayed.

3. The creation device according to claim 2, wherein
  the tag includes information relating to a component included in a module corresponding to the tag,
  wherein the processor is configured to:
    receive designation of the information relating to the component,
    calculate the number of pieces of information relating to the component included in the module, the pieces of information matching the information relating to the component, indicated by the designation, and
    control so that, in order stating a module where a value of the sum of the calculated number of words and the calculated number of pieces of information relating to the component is high, information where information relating to the module is arranged is displayed.

4. The creation device according to claim 2,
  wherein the processor is configured to control so that a fifth model when the module in which the condition is described is applied to the model to be searched for is displayed when the model to be searched for satisfies the condition.

5. A non-transitory computer-readable recording medium storing a program for causing a computer to execute a process, the process comprising:
  determining an additional component serving as a component added to a second model owing to application of a module, and a modification component serving as a modified component in a third model, on the basis of the second model and the third model, wherein a condition, in at least a portion of which a wild card is described, and a first model are described in the module, the first model serving as a model when the module is applied to a model satisfying the condition and serving as a model including a variable in which a character string in a model satisfying the condition is stored, the character string corresponding to the wild card, and the third model is a model when the module is applied to the second model satisfying the condition and where a character string in the second model, which corresponds to the wild card, is stored in a variable, extracting a word from the additional component and the modification component, on the basis of a word occurring in a fourth model to which a module, different from the module in which the condition and the first model are described, is applied, and an extracted word, calculating a degree indicating that the number of times the word occurs in the third model is high and indicating that the number of times the word occurs in the fourth model is low, and creating, on the basis of the degree, a tag corresponding to the module in which the condition and the first model are described, the tag including a word where the number of times the word occurs in the third model is greater than or equal to a first predetermined value and the number of times the word occurs in the fourth model is less than or equal to a second predetermined value.

6. A creation method executed by a computer, the creation method comprising:

determining an additional component serving as a component added to a second model owing to application of a module, and a modification component serving as a modified component in a third model, on the basis of the second model and the third model, wherein a condition, in at least a portion of which a wild card is described, and a first model are described in the module, the first model serving as a model when the module is applied to a model satisfying the condition and serving as a model including a variable in which a character string in a model satisfying the condition is stored, the character string corresponding to the wild card, and the third model is a model when the module is applied to the second model satisfying the condition and where a character string in the second model, which corresponds to the wild card, is stored in a variable, extracting a word from the additional component and the modification component, on the basis of a word occurring in a fourth model to which a module, different from the module in which the condition and the first model are described, is applied, and an extracted word, calculating a degree indicating that the number of times the word occurs in the third model is high and indicating that the number of times the word occurs in the fourth model is low, and creating, on the basis of the degree, a tag corresponding to the module in which the condition and the first model are described, the tag including a word where the number of times the word occurs in the third model is greater than or equal to a first predetermined value and the number of times the word occurs in the fourth model is less than or equal to a second predetermined value.

7. The creation method according to claim 6, further comprising:

receiving a model to be searched for and a word to be searched for;

calculating the number of words matching the word to be searched for, from among words included in the tag corresponding to the module in which the condition is described, when the model to be searched for satisfies the condition; and controlling so that, in order starting from a module where the calculated number of words is high, information where information relating to the module is arranged is displayed.

8. The creation method according to claim 7, wherein the tag includes information relating to a component included in a module corresponding to the tag, the creation method further comprising:

receive designation of the information relating to the component, calculate the number of pieces of information relating to the component included in the module, the pieces of information matching the information relating to the component, indicated by the designation, and control so that, in order stating a module where a value of the sum of the calculated number of words and the calculated number of pieces of information relating to the component is high, information where information relating to the module is arranged is displayed.

9. The creation method according to claim 7, further comprising:

controlling so that a fifth model when the module in which the condition is described is applied to the model to be searched for is displayed when the model to be searched for satisfies the condition.

\* \* \* \* \*